(12) United States Patent
Zhu et al.

(10) Patent No.: US 12,355,633 B2
(45) Date of Patent: *Jul. 8, 2025

(54) CONFIGURING A USER EQUIPMENT FOR MACHINE LEARNING

(71) Applicant: QUALCOMM Incorporated, San Diego, CA (US)

(72) Inventors: Xipeng Zhu, San Diego, CA (US); Gavin Bernard Horn, La Jolla, CA (US); Vanitha Aravamudhan Kumar, San Diego, CA (US); Vishal Dalmiya, San Diego, CA (US); Shankar Krishnan, San Diego, CA (US); Rajeev Kumar, San Diego, CA (US); Taesang Yoo, San Diego, CA (US); Eren Balevi, Brooklyn, NY (US); Aziz Gholmieh, Del Mar, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,896

(22) Filed: Jan. 18, 2024

(65) Prior Publication Data

US 2024/0223465 A1 Jul. 4, 2024

Related U.S. Application Data

(63) Continuation of application No. 17/467,156, filed on Sep. 3, 2021, now Pat. No. 11,916,754.

(51) Int. Cl.
*H04L 41/16* (2022.01)
*H04L 41/0803* (2022.01)
(Continued)

(52) U.S. Cl.
CPC .......... *H04L 41/16* (2013.01); *H04L 41/0803* (2013.01); *H04W 88/08* (2013.01); *G06N 20/00* (2019.01)

(58) Field of Classification Search
CPC .... H04L 41/16; H04L 41/0803; H04W 88/08; G06N 20/00
See application file for complete search history.

(56) References Cited

U.S. PATENT DOCUMENTS 11,424,962 B2    8/2022  Kumar et al.
2020/0053591 A1  2/2020  Prasad
(Continued)

FOREIGN PATENT DOCUMENTS

WO  WO-2021029889 A1  2/2021
WO  WO-2021063500 A1  4/2021
WO  WO-2021126907 A1  6/2021

OTHER PUBLICATIONS

International Search Report and Written Opinion—PCT/US2022/042314—ISA/EPO—Dec. 23, 2022.

*Primary Examiner* — Kenny S Lin
(74) *Attorney, Agent, or Firm* — Holland & Hart LLP

(57) ABSTRACT

Methods, systems, and devices for wireless communications are described. In some examples, a wireless communications system may support machine learning and may configure a user equipment (UE) for machine learning. The UE may transmit, to a base station, a request message that includes an indication of a machine learning model or a neural network function based at least in part on a trigger event. In response to the request message, the base station may transmit a machine learning model, a set of parameters corresponding to the machine learning model, or a configuration corresponding to a neural network function and may transmit an (Continued)

activation message to the UE to implement the machine learning model and the neural network function.

22 Claims, 18 Drawing Sheets

(51) Int. Cl.
*H04W 88/08* (2009.01)
*G06N 20/00* (2019.01)

(56) References Cited

U.S. PATENT DOCUMENTS

| | | | |
|---|---|---|---|
| 2021/0235407 A1 | 7/2021 | Zhang et al. | |
| 2021/0273707 A1 | 9/2021 | Yoo et al. | |
| 2021/0342687 A1 | 11/2021 | Wang et al. | |
| 2021/0369359 A1* | 12/2021 | Blanckaert | A61B 34/77 |
| 2022/0019940 A1 | 1/2022 | Suganuma | |
| 2022/0182263 A1 | 6/2022 | Kumar et al. | |
| 2022/0368570 A1 | 11/2022 | Lee et al. | |
| 2022/0377844 A1 | 11/2022 | Kumar et al. | |
| 2022/0394712 A1 | 12/2022 | Shahi et al. | |
| 2022/0400373 A1 | 12/2022 | Zhu et al. | |
| 2023/0075276 A1 | 3/2023 | Zhu et al. | |
| 2023/0100253 A1 | 3/2023 | Zhu et al. | |

\* cited by examiner

CONFIGURING A USER EQUIPMENT FOR MACHINE LEARNING

CROSS REFERENCE

The present Application for Patent is a continuation of U.S. patent application Ser. No. 17/467,156 by ZHU et al., entitled "CONFIGURING A USER EQUIPMENT FOR MACHINE LEARNING" and filed Sep. 3, 2021, which is assigned to the assignee hereof and expressly incorporated by reference herein.

FIELD OF TECHNOLOGY

The following relates to wireless communications, including configuring a user equipment (UE) for machine learning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support machine learning. Machine learning may be described as a branch of artificial intelligence that provides systems the ability to improve and learn from experience. In some examples, a network may configure a UE for machine learning and the UE may utilize machine learning to perform tasks such as cell reselection, beam failure, beam management, etc.

SUMMARY

The described techniques relate to improved methods, systems, devices, and apparatuses that support configuring a user equipment (UE) for machine learning. For example, the described techniques provide for a UE to obtain a neural network function, a machine learning model, and a corresponding set of parameters from a network.

In some examples, the UE may transmit capability information to the network. The capability information may include one or more of a list of potential neural network functions, a list of potential machine learning models, or an indication of whether or not the UE may request machine learning. Based on the capability information, the network may select a set of neural network functions, a set of machine learning models, and sets of corresponding parameters and in some examples, may indicate them to the UE.

In some examples, the UE may send a message to the network requesting to implement machine learning (e.g., based on some trigger). The message may include an indication of a neural network function, a neural network model, and a corresponding parameter set. In response to the request message, the network may configure the machine learning model and the corresponding parameters at the UE. When the UE obtains the machine learning model and the corresponding parameter set, the network may activate machine learning at the UE and the UE utilize machine learning to perform one or more tasks. The techniques as described herein may support machine learning at a UE. Machine learning may allow the UE to perform tasks with little or no instruction from the network. As such, machine learning at the UE, as supported by the techniques described herein, may result in less signaling overhead and reduce power consumption at the UE.

A method for wireless communication at a UE is described. The method may include receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning model repository (MR) that is included in or coupled with a base station and receiving, from the base station, an activation message for the machine learning model, the neural network function, or both.

An apparatus for wireless communication at a UE is described. The apparatus may include a processor, memory coupled with the processor, and instructions stored in the memory. The instructions may be executable by the processor to cause the apparatus to receive a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station and receive, from the base station, an activation message for the machine learning model, the neural network function, or both.

Another apparatus for wireless communication at a UE is described. The apparatus may include means for receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station and means for receiving, from the base station, an activation message for the machine learning model, the neural network function, or both.

A non-transitory computer-readable medium storing code for wireless communication at a UE is described. The code may include instructions executable by a processor to receive a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station and receive, from the base station, an activation message for the machine learning model, the neural network function, or both.

Some examples of the method, apparatuses, and non-transitory computer-readable medium described herein may further include operations, features, means, or instructions for transmitting, to the base station, a request message that includes an indication of the machine learning model, the neural network function, or both, where receiving the machine learning model, the neural network function, or both may be based on the request message.

Some examples of the method, apparatuses, and non-transitory computer-readable medium described herein may further include operations, features, means, or instructions for receiving, from the base station, signaling indicating a first set of machine learning models included in a blacklist, a second set of machine learning models included in a whitelist, or both, where transmitting the request message may be based on the machine learning model being included in the whitelist, excluded from the blacklist, or both.

In some examples of the method, apparatuses, and non-transitory computer-readable medium described herein, each machine learning model of the one or more machine learning models may be associated with a respective scope corresponding to a location, a network slice, a deep neural network (DNN), a public land mobile network (PLMN), a UE type, a radio resource control (RRC) state, a communication service, a communication configuration, or any combination thereof and transmitting the request message may be based on a trigger event that includes the UE having a condition that may be within the respective scope of the machine learning model.

In some examples of the method, apparatuses, and non-transitory computer-readable medium described herein, the request message includes an indication of the trigger event.

In some examples of the method, apparatuses, and non-transitory computer-readable medium described herein, transmitting the request message may include operations, features, means, or instructions for transmitting a UE assistance information message that includes the request message.

In some examples of the method, apparatuses, and non-transitory computer-readable medium described herein, transmitting the request message may include operations, features, means, or instructions for transmitting RRC signaling that includes the request message.

Some examples of the method, apparatuses, and non-transitory computer-readable medium described herein may further include operations, features, means, or instructions for transmitting the request message includes transmitting the request message to a central unit-control plane (CU-CP) entity included in the base station and receiving the machine learning model, the set of parameters, or the configuration includes receiving the machine learning model, the set of parameters, or the configuration from the CU-CP entity.

Some examples of the method, apparatuses, and non-transitory computer-readable medium described herein may further include operations, features, means, or instructions for determining an address for the machine learning model, the set of parameters, or the configuration based on an associated ID and an associated rule, where receiving the machine learning model, the set of parameters, or the configuration may be based on a download of the machine learning model, the set of parameters, or the configuration from the machine learning MR based on the address.

Some examples of the method, apparatuses, and non-transitory computer-readable medium described herein may further include operations, features, means, or instructions for determining an address for a second machine learning model, a second set of parameters corresponding to the second machine learning model, or a second configuration corresponding to a second neural network function of the one or more neural network functions based on an associated ID and an associated rule and initiating an upload of the second machine learning model, the second set of parameters, or the second configuration to the machine learning MR based on the address for the second machine learning model, the second set of parameters, or the second configuration.

Some examples of the method, apparatuses, and non-transitory computer-readable medium described herein may further include operations, features, means, or instructions for receiving an address for the machine learning model, the set of parameters, or the configuration from a central unit-machine learning plane (CU-XP) entity included in the base station, where receiving the machine learning model, the set of parameters, or the configuration may be based on a download of the machine learning model, the set of parameters, or the configuration from the machine learning MR based on the address.

Some examples of the method, apparatuses, and non-transitory computer-readable medium described herein may further include operations, features, means, or instructions for receiving an address for a second machine learning model, a second set of parameters corresponding to the second machine learning model, or a second configuration corresponding to a second neural network function of the one or more neural network functions from a CU-XP entity included in the base station and initiating an upload of the second machine learning model, the second set of parameters, or the second configuration to the machine learning MR based on the address for the second machine learning model, the second set of parameters, or the second configuration.

A method for wireless communication at a base station is described. The method may include transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station and transmitting, to the UE, an activation message for the machine learning model, the neural network function, or both.

An apparatus for wireless communication at a base station is described. The apparatus may include a processor, memory coupled with the processor, and instructions stored in the memory. The instructions may be executable by the processor to cause the apparatus to transmit, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station and transmit, to the UE, an activation message for the machine learning model, the neural network function, or both.

Another apparatus for wireless communication at a base station is described. The apparatus may include means for transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station and means for transmitting, to the UE, an activation message for the machine learning model, the neural network function, or both.

A non-transitory computer-readable medium storing code for wireless communication at a base station is described. The code may include instructions executable by a processor to transmit, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station and transmit, to the UE, an activation message for the machine learning model, the neural network function, or both.

Some examples of the method, apparatuses, and non-transitory computer-readable medium described herein may further include operations, features, means, or instructions for receiving, from the UE, a request message that includes an indication of the machine learning model, the neural network function, or both, where transmitting the machine learning model, the neural network function, or both may be based on the request message.

Some examples of the method, apparatuses, and non-transitory computer-readable medium described herein may further include operations, features, means, or instructions for transmitting, to the UE, signaling indicating a first set of machine learning models included in a blacklist, a second set of machine learning models included in a whitelist, or both, where the machine learning model may be included in the whitelist, excluded from the blacklist, or both.

In some examples of the method, apparatuses, and non-transitory computer-readable medium described herein, each machine learning model of the one or more machine learning models may be associated with a respective scope corresponding to a location, a network slice, a DNN, a PLMN, a UE type, an RRC state, a communication service, a communication configuration, or any combination thereof and receiving the request message may be based on a trigger event that includes the UE having a condition that may be within the respective scope of the machine learning model.

In some examples of the method, apparatuses, and non-transitory computer-readable medium described herein, the request message includes an indication of the trigger event.

In some examples of the method, apparatuses, and non-transitory computer-readable medium described herein, receiving the request message may include operations, features, means, or instructions for receiving a UE assistance information message that includes the request message.

In some examples of the method, apparatuses, and non-transitory computer-readable medium described herein, receiving the request message may include operations, features, means, or instructions for receiving RRC signaling that includes the request message.

Some examples of the method, apparatuses, and non-transitory computer-readable medium described herein may further include operations, features, means, or instructions for receiving the request message at a CU-CP entity included in the base station, forwarding the request message from the CU-CP entity to a CU-XP entity included in the base station, and downloading, to the CU-CP entity, the machine learning model, the set of parameters, or the configuration from the machine learning MR based on the request message, where transmitting the machine learning model, the set of parameters, or the configuration to the UE may be based on the downloading.

Some examples of the method, apparatuses, and non-transitory computer-readable medium described herein may further include operations, features, means, or instructions for receiving, from the UE, an address for the machine learning model, the set of parameters, or the configuration and downloading, for the UE, the machine learning model, the set of parameters, or the configuration from the machine learning MR based on the address.

Some examples of the method, apparatuses, and non-transitory computer-readable medium described herein may further include operations, features, means, or instructions for receiving, from the UE, an address for a second machine learning model, a second set of parameters corresponding to the second machine learning model, or a second configuration corresponding to a second neural network function of the one or more neural network functions and uploading the second machine learning model, the second set of parameters, or the second configuration to the machine learning MR.

Some examples of the method, apparatuses, and non-transitory computer-readable medium described herein may further include operations, features, means, or instructions for receiving, from the UE at a CU-XP entity included in the base station, an ID associated with the machine learning model, the set of parameters, or the configuration, determining an address for the machine learning model, the set of parameters, or the configuration based at least in part on the ID, and downloading, for the UE, the machine learning model, the set of parameters, or the configuration from the machine learning MR based on the address, where transmitting the machine learning model, the set of parameters, or the configuration to the UE may be based on the downloading.

Some examples of the method, apparatuses, and non-transitory computer-readable medium described herein may further include operations, features, means, or instructions for receiving, from the UE at a CU-XP entity included in the base station, an ID associated with a second machine learning model, a second set of parameters corresponding to the second machine learning model, or a second configuration corresponding to a second neural network function of the one or more neural network functions, determining an address for the second machine learning model, the second set of parameters, or the second configuration based at least in part on the ID, and uploading, to the machine learning MR, the second machine learning model, the second set of parameters, or the second configuration based on the address.

DETAILED DESCRIPTION

A user equipment (UE) may utilize machine learning to perform different communication procedures. For example, the UE may utilize machine learning to perform cell reselection, channel state information (CSI) reporting, etc. To utilize machine learning, the UE may obtain knowledge of a neural network function, a machine learning model, and corresponding parameters. Improved solutions may be desired to support the configuration of machine learning at the UE (e.g., the provision of neural network functions, machine learning models, and corresponding parameters to a UE).

Described herein are improved architectures and techniques by which a network may configure a UE to utilize machine learning. In some examples, a base station may include multiple network entities such as, for example, a central unit user plane (CU-UP), a central unit control plane (CU-CP), and a distributed unit (DU). In some cases, the base station may additionally or alternatively include another central unit that is configured to facilitate the exchange of messages pertaining to machine learning (e.g., a central unit machine learning plane (CU-XP)). Further, the base station may include or be in communication with an model repository (MR) that is configured to store multiple machine learning models and corresponding parameters. In some cases, a central unit may alternatively be referred to as a centralized unit.

In some cases, the network may provide the UE with a neural network model, an machine learning model, corresponding parameters, or any combination thereof in response to a request from the UE to implement machine learning. In some examples, the UE may download the neural network function, the machine learning model, or corresponding parameters via the user plane (e.g., directly from the MR). In other examples, the UE may download the neural network function, the machine learning model, or corresponding parameters via the control plane (e.g., obtain the model from the CU-CP). The messages exchanged between the UE and the network pertaining to machine learning (e.g., request message) may be signaled via radio resource control (RRC) (e.g., over existing or new radio bearers, using new containers within RRC messages, or any combination thereof). The techniques as described herein may enable machine learning at a UE. Machine learning may allow a UE to perform tasks with little or no instruction from the network. As such, enabling machine learning at the UE may result in less signaling overhead and reduced power consumption at the UE.

Aspects of the disclosure are initially described in the context of wireless communications systems. Additional aspects are described in the context of a protocol stack and process flows. Aspects of the disclosure are further illustrated by and described with reference to apparatus diagrams, system diagrams, and flowcharts that relate to configuring a UE for machine learning.

Figure 1:
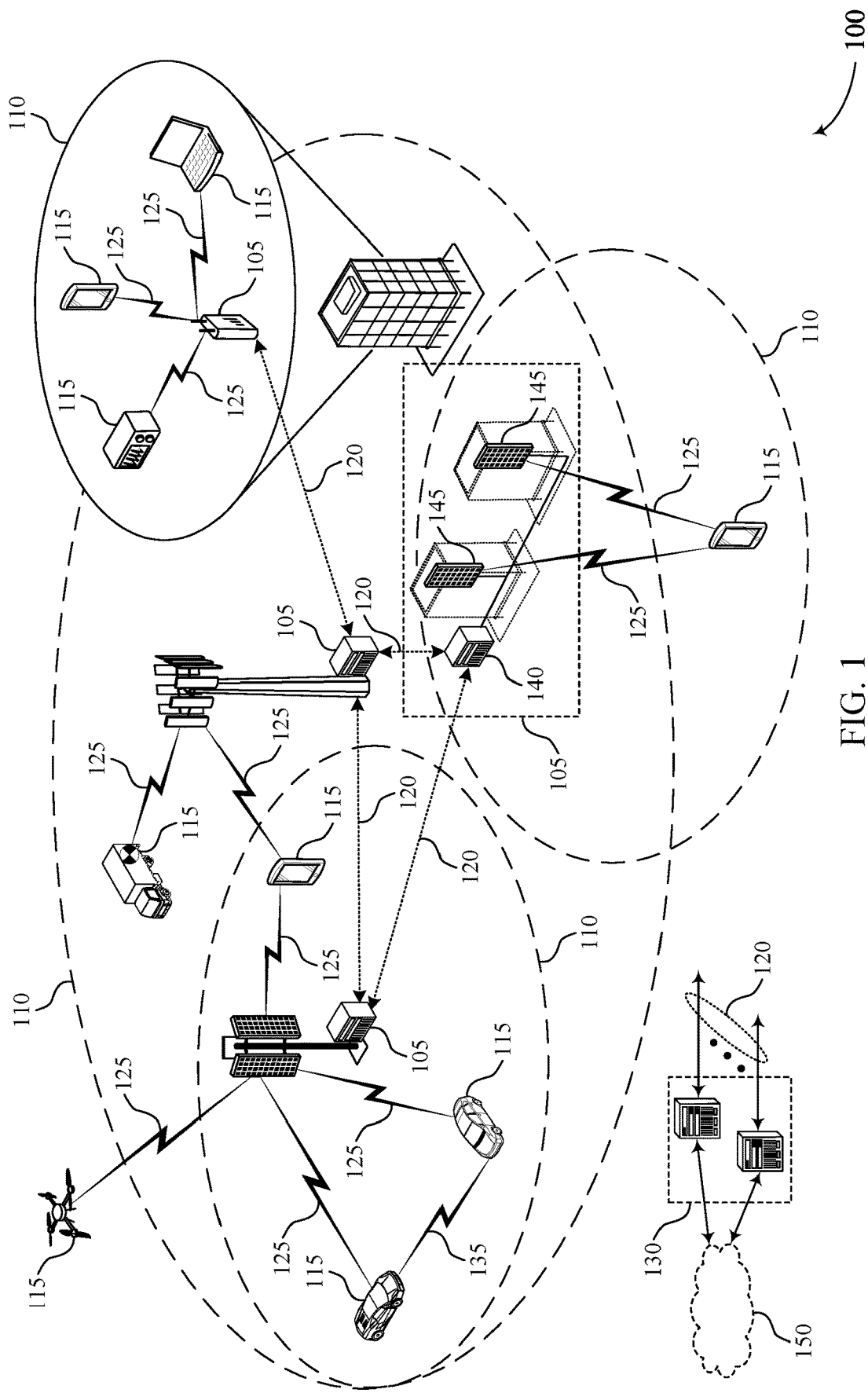
FIG. 1 illustrates an example of a wireless communications system that supports configuring a user equipment (UE) for machine learning in accordance with aspects of the present disclosure.

FIG. 1 illustrates an example of a wireless communications system 100 that supports configuring a UE for machine learning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a network may configure the UE 115 for machine learning. The UE 115 may transmit capability information to the network (e.g., the base station 105). The capability information may include one or more of a list of potential neural network functions, a list of potential machine learning models, or an indication of whether or not the UE 115 may request machine learning. Based on the capability information, the network may select a set of neural network functions, a set of machine learning models, and sets of corresponding parameters and indicate them to the UE 115. In some examples, the UE 115 may send a message to the network requesting to implement machine learning (e.g., based on some trigger). The message may include an indication of a neural network function, a neural network model, and a corresponding parameter set. In response to the request message, the network may configure the machine learning model and the corresponding parameters at the UE 115. When the UE 115 obtains the machine learning model and the corresponding parameter set, the network may activate machine learning at the UE 115 and the UE 115 utilize machine learning to perform one or more tasks. The techniques as described herein may enable machine learning at a UE 115. Machine learning may allow a UE 115 to perform tasks with little or no instruction from the network. As such, enabling machine learning at the UE may result in less signaling overhead and reduced power consumption at the UE 115.

Figure 2A:
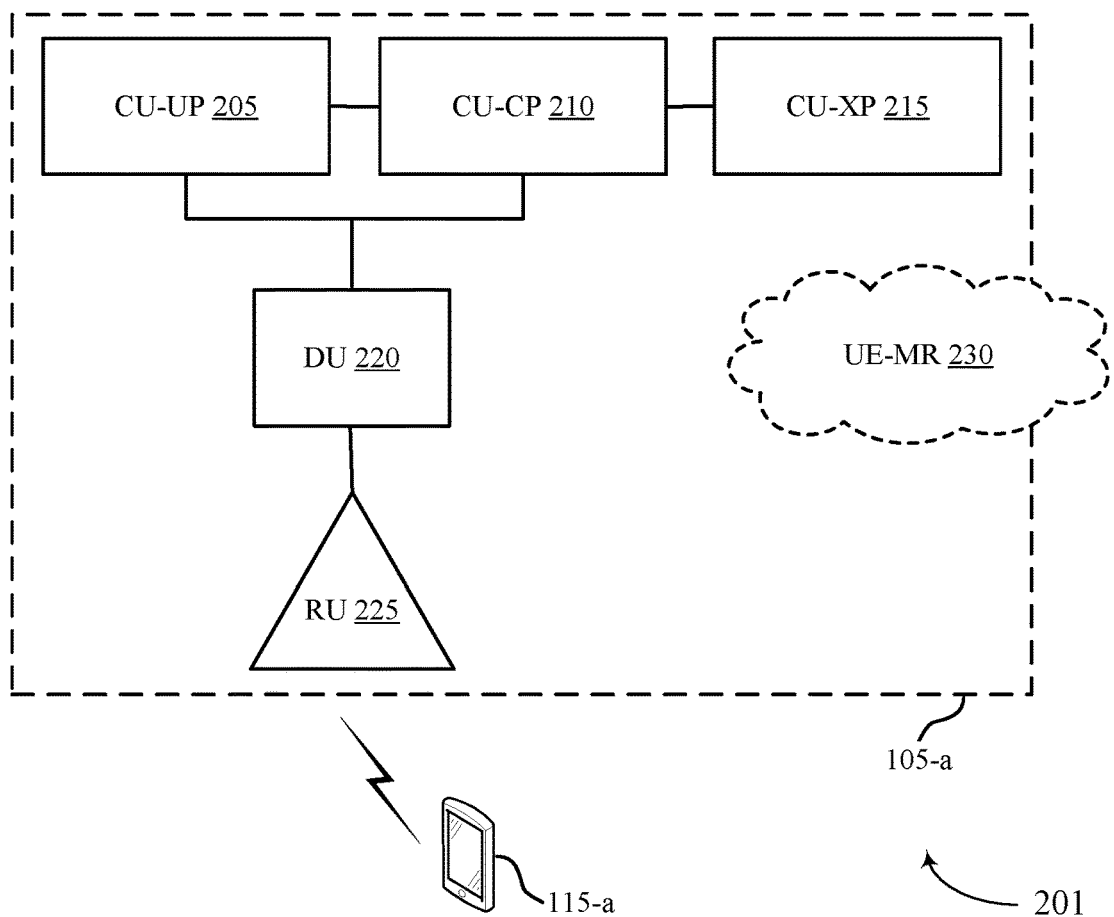
FIG. 2A illustrates an example of a wireless communications system that supports configuring a UE for machine learning in accordance with aspects of the present disclosure.

FIG. 2A illustrates an example of a wireless communications system 201 that supports configuring a UE for machine learning in accordance with aspects of the present disclosure. In some examples, the wireless communications system 201 may implement or be implemented by a wireless communications system 100. For example, the wireless communications system 201 may include a base station 105-a and a UE 115-a which may be examples of a base station 105 and a UE 115 as described with reference to FIG. 1.

Figure 2B:
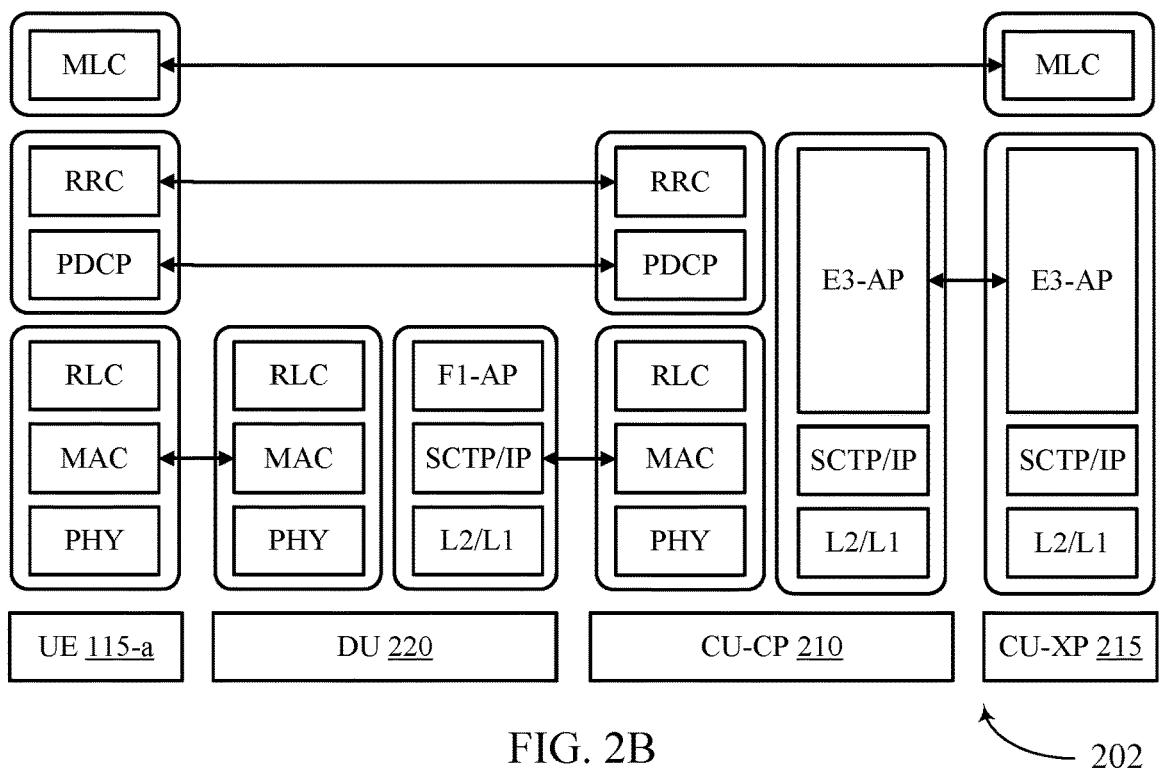
FIG. 2B illustrates an example of a protocol stack that supports configuring a UE for machine learning in accordance with aspects of the present disclosure.

FIG. 2B illustrates an example of a protocol stack 202 that supports configuring a UE for machine learning as described herein. In some examples, the protocol stack 202 may implement or be implemented by a wireless communications system 100. For example, the protocol stack 202 may be implemented by a base station 105 and a UE 115 as described with reference to FIG. 1.

In some examples, the wireless communications system 201 may support machine learning or artificial intelligence. Using machine learning, devices (e.g., the base station 105-a or the UE 115-a) may perform tasks without being explicitly programmed to do so. In order to perform machine learning, the device may obtain a neural network function and a neural network model. The neural network function may be defined as a function supported by one or more neural network models and may be specific to the task being performed. The inputs and outputs of each neural network function may be set (e.g., standardized) and each neural network function may be identified by a neural network function identifier (ID). The neural network model may be defined as a model structure and a parameter set. The model structure may be identified by a model ID and each model ID may be associated with a neural network function. The model ID may also specify the set of parameters corresponding to the neural network model. The set of parameters may include the weights of the neural network model and other configuration parameters. In some examples, the UE 115-*a* may utilize machine learning for cell reselection, beam management, etc. However, methods for configuring a UE 115-*a* for machine learning may be lacking or inefficient.

In some examples, a base station 105 may include different network entities. For example, the base station 105-*a* may include at least a CU-UP 205, a CU-CP 210, a DU 220, and a radio unit (RU) 225. The CU-CP 210 may host the control plane part of the packet data convergence protocol (PDCP) and the CU-UP 205 may host the user plane part of the PDCP. The DU 220, on the other hand, may support lower layer signaling (e.g., medium access control (MAC) protocol or radio link control (RLC) protocol) and the RU 225 may support physical layer signaling as well as digital beamforming functionality. The CU-UP 205 may be connected to the CU-CP 210 via an E1 interface. Moreover, the CU-UP 205 may be connected to the DU 220 via an F1-U interface and the CU-CP 210 may be connected to the DU 220 via an F1-C interface. To support machine learning at the UE 115-*a* as described herein, the base station 105-*a* may also include a CU-XP 215. The CU-XP 215 may host the machine learning control (MLC) protocol as shown in FIG. 2B. The MLC protocol may define the control plane messaging for managing machine learning or artificial intelligence at the network. In some examples, the CU-XP 215 may be connected to the CU-UP via an E3 interface. Moreover, the base station 105-*a* may be in communication with a UE model repository (UE-MR) 230. The UE-MR 230 may be defined as a central location in which the neural network models are stored (e.g., cloud storage, online storage, etc.).

To implement machine learning at the UE 115-*a*, MLC messages may be exchanged between the CU-XP 215 and the UE 115-*a*. MLC messages may be defined as control messages that facilitate machine learning or artificial intelligence. In some examples, MLC messages may be exchanged between the UE 115-*a* and the CU-XP 215 via RRC signaling. For example, the UE 115-*a* and the CU-CP 210 may exchange RRC signaling that includes a container that carries an MLC message intended for the CU-XP 215. The CU-CP 210 may then forward the MLC message to the CU-XP 215. The RRC container may be decoded at the CU-XP 215 and sent to the MLC layer. In some examples, the MLC message may be carried over signaling radio bearer (SRB) 2 in RRC. In another example, a new SRB may be defined for machine learning (e.g., SRB X) and the MLC message may be carried over the newly defined SRB in RRC. In some examples, the MLC message can be piggybacked by existing RRC messages. For example, the MLC message may be included in an RRC reconfiguration message, an RRC reconfiguration complete message, or an RRC setup/resume complete message as a container.

Figure 3:
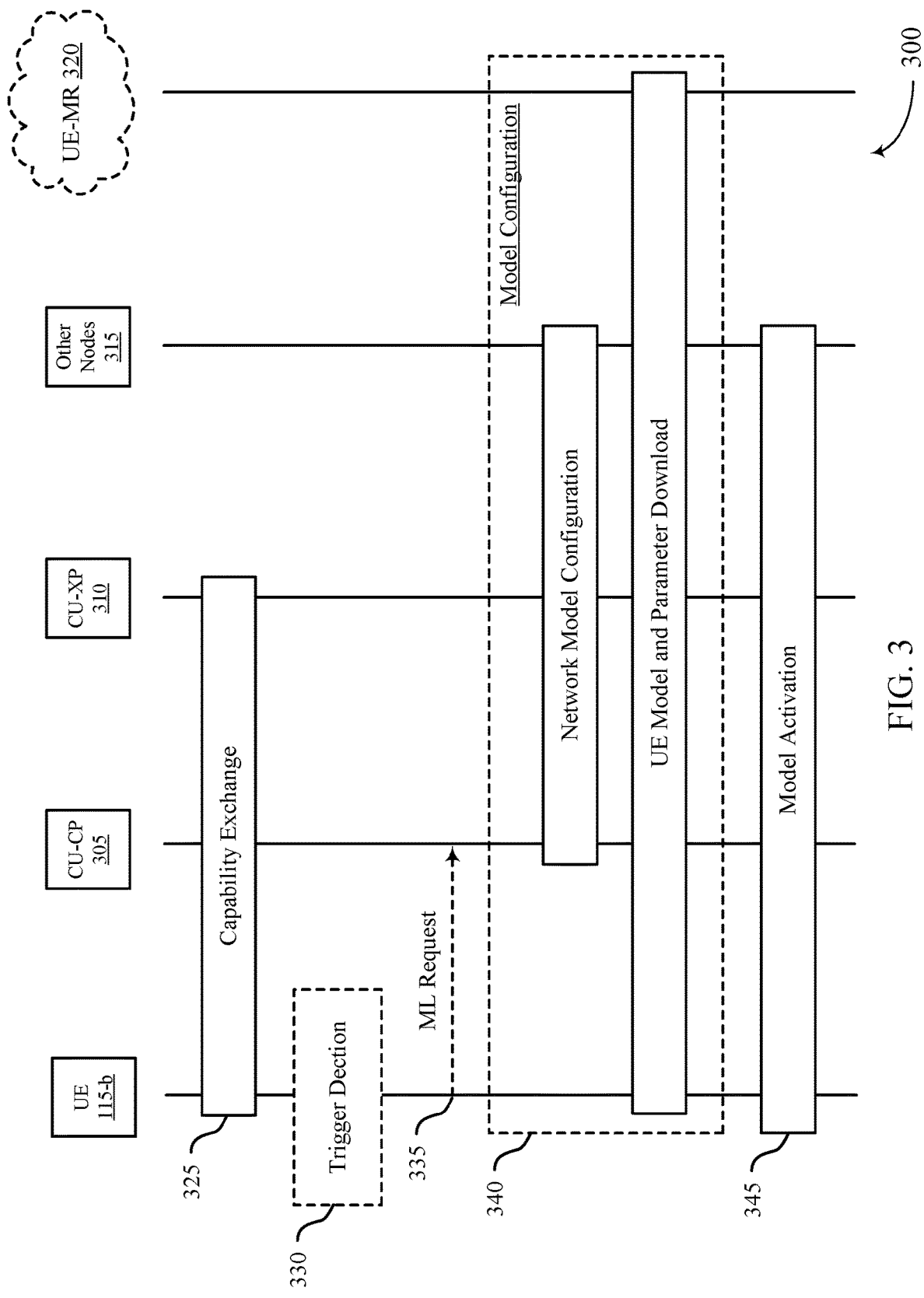
FIG. 3 through 6 illustrate examples of a process flow that supports configuring a UE for machine learning in accordance with aspects of the present disclosure.

FIG. 3 illustrates an example of a process flow 300 that supports configuring a UE for machine learning in accordance with aspects of the present disclosure. In some examples, the process flow 300 may be implemented by aspects of a wireless communications system 100 and a wireless communications system 201. For example, the process flow 300 may be performed by a UE 115-*b*, a CU-CP 305, a CU-XP 310, and a UE-MR 320 which may be examples of a UE 115, a CU-CP 210, a CU-XP 215, and a UE-MR 230 as described with reference to FIG. 2. The process flow 300 may support a network configuring the UE 115-*b* for machine learning. Alternative examples of the following may be implemented, where some steps are performed in a different order then described or are not performed at all. In some cases, steps may include additional features not mentioned below, or further steps may be added.

At 325, the UE 115-*b* may exchange capability information related to machine learning with the network. In some examples, the CU-CP 305 may send a message to the UE 115-*b* enquiring about the capability information and the UE 115-*b* may send the capability information to the CU-CP 305 based on receiving the message enquiring about the capability information. Upon receiving the capability information from the UE 115-*b*, the CU-CP 305 may forward the capability information to the CU-XP 310. In some examples, the capability information may include a list of neural network functions supported by the UE 115-*b*, a list of neural network models (e.g., a list of model IDs) supported by the UE 115-*b*, an indication of whether or not the UE 115-*b* may request to be configured for machine learning, etc. Based on the capability information, the CU-CP 305 or the CU-XP 310 may determine one or more neural network functions from the list of neural network functions, one or more model IDs from the list of model IDs, and IDs of corresponding sets of parameters. An indication of the one or more neural network functions, the one or more model IDs, and the corresponding parameter set IDs may be sent to the UE 115-*b* from the CU-CP 305 in a MLC container as part of an RRC message (e.g., an RRC reconfiguration message). To confirm receipt of the RRC message and the MLC container, the UE 115-*b* may transmit an RRC message (e.g., an RRC reconfiguration complete message) to the CU-CP 305.

In some examples, the UE 115-*b* may request to implement machine learning (perform machine learning for a specific task). In such example, the RRC message to the UE 115-*b* to from the CU-CP 305 may also include a prohibit timer for the machine learning request. The prohibit timer may limit the number of times that the UE 115-*b* may send a machine learning request to the network. Additionally or alternatively, the RRC message may include an indication of a blacklist of neural network functions, model IDs, and corresponding parameter set IDs and a whitelist of neural network functions, model IDs, and corresponding parameter set IDs The UE 115-*b* may be able to request to implement models in the whitelist, but may be unable to request to implement models in the blacklist. Each model ID of the one or more model IDs indicated to the UE 115-*b* at 325 may be associated with a condition (or applicable scope). The condition may be a location (e.g., a cell, a cell list, tracking area identity (TAI), radio access network notification area (RNA), multi-broadcast single-frequency network (MBSFN) area, or a geographical area), a network slice, a deep neural network (DNN) type, a public land mobile network (PLMN) list (e.g., a list of public network integrated non-public network (PNI-NPN) IDs or standalone nonpublic network (SNPN) IDs), a type of UE, RRC states, a type of service (e.g., multi-broadcast service (MBS) or sidelink), or a configuration (e.g., MIMO, dual connectivity/carrier aggregation (DC/CA), or mmW).

At 330, the UE 115-*b* may potentially determine whether a condition associated with a model ID of the one or more model IDs is satisfied. For example, the UE 115-*b* may determine that the UE 115-*b* has left a cell associated with a first model ID and entered a cell associated with a second model ID. When the UE 115-*b* determines that the condition associated with a model ID is satisfied, the UE 115-*b* may send a machine learning request message to the CU-CP 305 at 335. The machine learning request message may include one or more of the model ID whose condition was satisfied (e.g., the second model ID), a neural network function of the one or more neural network functions, or an indication of the condition that was satisfied. In some examples, the UE 115-*b* may include the machine learning request in a UE assistance information message. More specifically, a machine learning assistance information element including the information of the machine learning request message may added to the UE assistance information. In some examples, if the models whose condition is satisfied is included in the blacklist, the UE 115-*b* may not send the machine learning request.

Upon receiving the machine learning request from the UE 115-*b*, the network (e.g., CU-XP 310 or CU-CP 305) may select a neural network function (e.g., from the one or more neural network functions indicated in the machine learning request message received at 335) and a machine learning model (e.g., select a machine learning model corresponding to the model ID indicated in the machine learning request message received at 335) and configure the UE 115-*b* with the machine learning model as well as a corresponding set of parameters at 340. In some examples, configuring the UE 115-*b* with the neural network model may include downloading the neural network model from the UE-MR 320. The different aspects of neural network model download and upload are discussed in more detail in FIGS. 4-6.

In addition to the UE 115-*b*, other network nodes 315 (e.g., distributed unit, CU-UP, or RIC) may be configured with the selected machine learning model and corresponding set of parameters. To configure the other network nodes 315, the CU-XP 310 may send a model setup request message to the other network nodes 315, where the model setup request message may include a model ID of the selected neural network model and corresponding parameter set ID. The other network nodes 315 may send the model ID and the parameter set ID to the MDAC via a model querying request message and the MDAC may transmit a model querying response to the other network nodes including an address (e.g., a web address or a URL) corresponding to the model ID and an address corresponding to the parameter ID. Upon receiving the model querying response message, the other network nodes 315 may download the neural network model associated with the model ID and the parameter set associated with the parameter set ID by their respective web addresses from the UE-MR 320. The other network nodes 315 may then confirm configuration of the neural network model and corresponding parameter set via a model setup response message to the CU-XP 310 and the CU-XP 310 may forward the confirmation of the neural network model configuration via a neural network response message to the CU-CP 305.

At 345, the network may activate the neural network model. To activate the neural network model at the UE 115-*b*, the UE 115-*b* may transmit a model activation request message to the other network nodes 315 via the CU-CP 305 requesting activation of machine learning and the other network nodes may send a model activation response message to the UE 115-*b* via a MAC-CE or RRC signaling activating the machine learning at the UE 115-*b*. To activate the neural network model at the network, the CU-CP 305 may send a model activation message to the CU-XP 310 and the CU-XP 310 may send the model activation message to the other network nodes 315 activating machine learning at the other network nodes 315.

Figure 4:
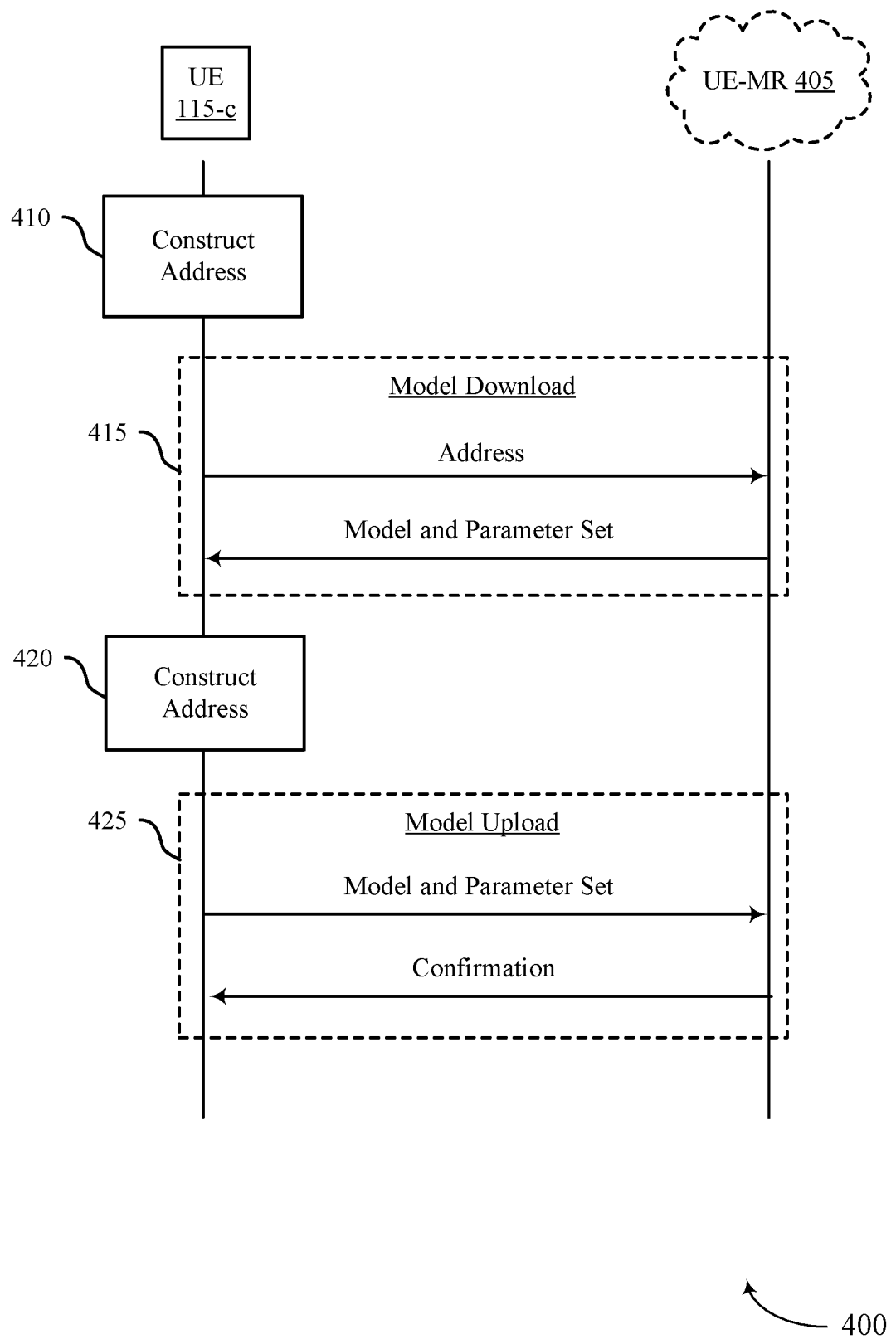

FIG. 4 illustrates an example of a process flow 400 that supports configuring a UE for machine learning in accordance with aspects of the present disclosure. In some examples, the process flow 400 may be implemented by aspects of a wireless communications system 100, a wireless communications system 201, and a process flow 300. For example, the process flow 400 may be performed by a UE 115-*c* and a UE-MR 405 which may be examples of a UE 115 and a UE-MR 230 as described with reference to FIG. 2. The process flow 400 may support the upload and download of neural network models and parameter sets at the UE 115-*c*. Alternative examples of the following may be implemented, where some steps are performed in a different order then described or are not performed at all. In some cases, steps may include additional features not mentioned below, or further steps may be added.

As described with reference to FIG. 3, the network (e.g., a CU-CP or a CU-XP) may select a neural network function, a neural network model, and a corresponding set of parameters (e.g., based on a capability of the UE 115-*c* or based on a request message from the UE 115-*c*) and indicate the neural network function, the neural network model, and the corresponding set of parameters to the UE 115-*c* such that the UE 115-*c* may perform machine learning. For example, the network may transmit message (e.g., an RRC reconfiguration message) including a neural network function ID, a model ID, and a corresponding parameter set ID. The UE 115-*c* may then perform the following procedure to download the indicated neural network model and the corresponding set of parameters.

At 410, the UE 115-*c* may construct an address (e.g., a web address or a URL) of the neural network model and an address (e.g., a web address or a URL) of the set of parameters. In some examples, the UE 115-*c* may construct the addresses based on the model ID and the parameters set ID. The model ID and the parameter set ID may act as input for a predefined rule.

At 415, the UE 115-*c* may download the model and the corresponding set of parameters from the UE-MR 405 by the addresses. The UE 115-*c* may send the address of the neural network model and in some examples, the address of the set of parameters to the UE-MR 405. For example, the UE 115-*c* may send an HTTP GET message including the address of the neural network model and an HTTP GET message including the address of the set of parameters. Upon receiving the addresses, the UE-MR 405 may send the neural network model (e.g., in a 200 GET message) and the corresponding set of parameters (e.g., in a 200 GET message) to the UE 115-*c*. That is, the UE 115-*c* may download the neural network model and the set of parameters from the UE-MR 405 by their respective addresses. In some examples, the UE 115-*c* may cache frequently used neural network models and parameter sets. In some examples, a version tag and a timer may be used to evaluate and guard the freshness of the cached neural network models and parameter sets. If the neural network model and the parameter set are cached locally, the UE 115-*c* may not download the neural network model and the parameter set from the UE-MR 405, but instead obtain the neural network model and the parameter set from the cached data.

In some examples, the UE 115-*c* may not obtain the neural network model and the set of parameters from the UE-MR 405, but may obtain the neural network model and the set of parameters elsewhere (e.g., using a model training configuration). In such example, the UE 115-*c* may upload the neural network model and the set of parameters to the UE-MR 405 such that the UE-MR 405 may store the neural network models and the set of parameters for future use or such that other devices may access the neural network model and the set of parameters.

In some examples, at 420, the UE 115-c may construct an address (e.g., a web address or a URL) of the set of parameters. In another example, the UE 115-c may construct an address (e.g., a web address or a URL) for both the neural network model and the set of parameters. The UE 115-c may know the address from the training configuration or the UE 115-c may determine the address using a predefined rule where the neural network model ID associated with the neural network model and the parameter set ID associated with the set of parameters are used as inputs.

At 425, the UE 115-c may upload the parameter set and, in some examples, the neural network model to the UE-MR 405 by the address. In some examples, the UE 115-c may upload the set of parameters or the neural network model to the UE-MR 405 by sending a HTTP PUT message to the UE-MR 405 including the neural network model and the set of parameters. To confirm receipt of the set of parameters or the neural network model, the UE-MR may send a confirmation message (e.g., a 200 OK message) to the UE 115-c.

Figure 5:
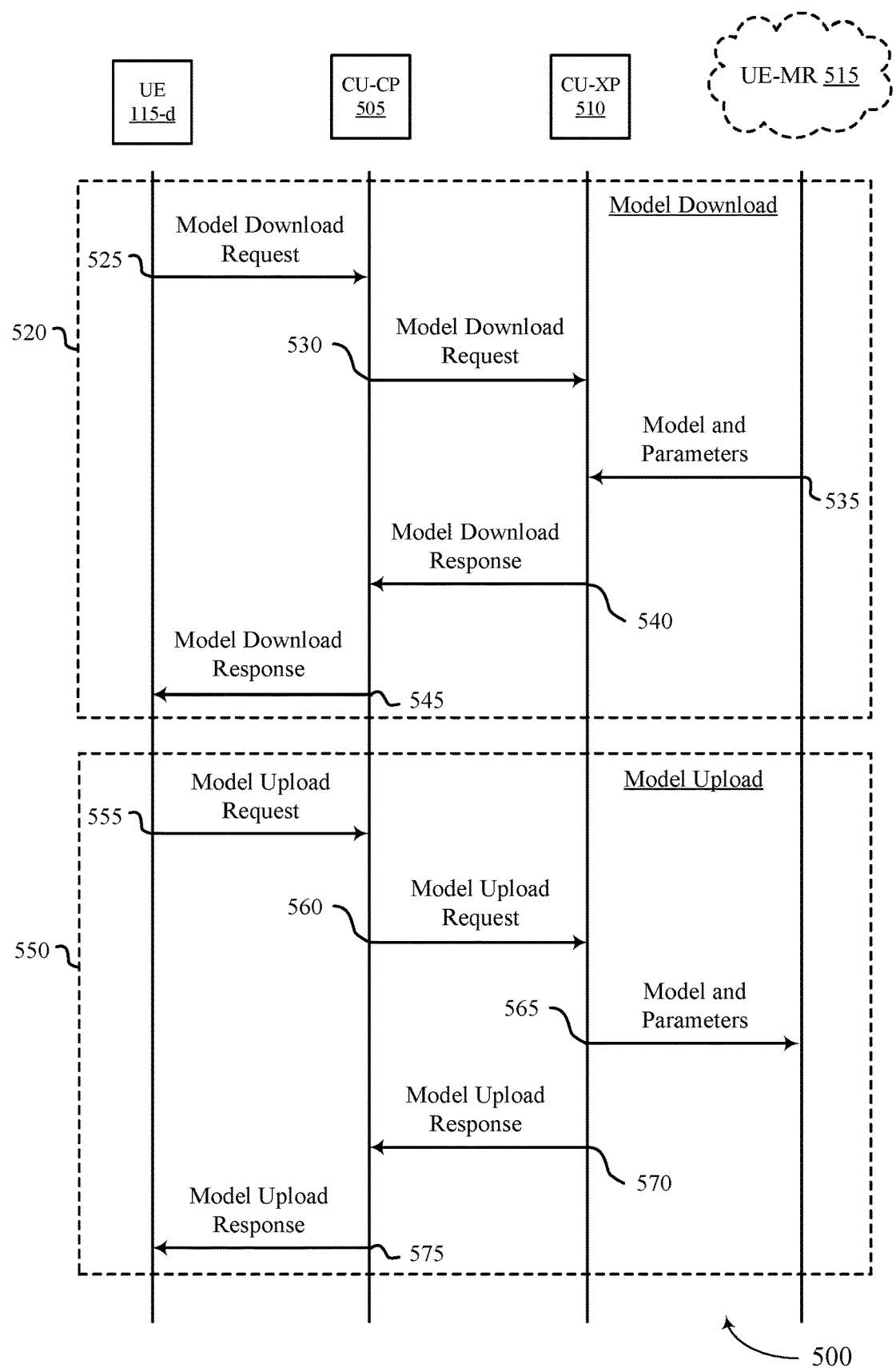

FIG. 5 illustrates an example of a process flow 500 that supports configuring a UE for machine learning in accordance with aspects of the present disclosure. In some examples, the process flow 500 may be implemented by aspects of a wireless communications system 100, a wireless communications system 201, a process flow 300, or a process flow 400. For example, the process flow 500 may be performed by a UE 115-d, a CU-CP 505, a CU-XP 510, and a UE-MR 515 which may be examples of a UE 115, a CU-CP 210, a CU-XP 215, and a UE-MR 230 as described with reference to FIG. 2. The process flow 500 may support the upload and download of neural network models and parameter sets at the UE 115-d. Alternative examples of the following may be implemented, where some steps are performed in a different order then described or are not performed at all. In some cases, steps may include additional features not mentioned below, or further steps may be added.

As described with reference to FIG. 3, the network (e.g., a CU-CP 505 or a CU-XP 510) may select a neural network function, a neural network model, and a corresponding set of parameters (e.g., based on a capability of the UE 115-d or based on a request message from the UE 115-d) and indicate the neural network function, the neural network model, and the corresponding set of parameters to the UE 115-d such that the UE 115-d may perform machine learning. For example, the network may transmit message (e.g., an RRC reconfiguration message) including a neural network function ID, a model ID, and a corresponding parameter set ID. The UE 115-d may then perform the following procedure to obtain the indicated neural network model and the corresponding set of parameters.

At 520, the UE 115-d may obtain the neural network model and the corresponding set of parameters from the network. First, the UE 115-d may send a model download request message to the CU-CP 505 at 525. The model download request message may include the model ID corresponding to the neural network model and the parameter set ID corresponding to the set of parameters. In some examples, the UE 115-d may transmit the download request message to the CU-CP 505 via RRC signaling over SRB 2.

At 530, the CU-CP 505 may forward the model download request to the CU-XP 510. The CU-XP 510 may then retrieve the neural network model and the set of parameters from the UE-MR 515 at 535. Similar to how the UE 115 downloads the neural network model and the set of parameters in FIG. 4, the CU-XP 510 may construct addresses for the neural network model and the set of parameters using the model ID and the parameter set ID and download the neural network model and the set of parameters using the addresses from the UE-MR 515. Alternatively, the CU-XP 510 may obtain the addresses from another network entity (e.g., MDAC).

At 540, the CU-XP 510 may transmit a model download response message to the CU-CP 505. The model download model response message may include the neural network model and the set of parameters.

At 545, the CU-CP 505 may forward the model download response message to the UE 115-d. In some example, the CU-CP 505 may send the model download response message to the UE 115-d via RRC signaling over a new SRB (e.g., SRB X). If the size of the neural network model and the set of parameters is above a threshold, RRC segmentation may be used to send the neural network model and the set of parameters to the UE 115-d.

In some examples, the UE 115-d may not obtain the neural network model and the set of parameters from the UE-MR 515, but may obtain the neural network model and the set of parameters elsewhere (e.g., using a model training configuration). In such example, the UE 115-d may upload the neural network model and the set of parameters to the UE-MR 515 such that the UE-MR 515 may store the neural network models and the set of parameters for future use or such that other devices may access the neural network model and the set of parameters.

At 550, the UE 115-d may upload the neural network model and the set of parameters to the UE-MR 515 via one or more network nodes. For example, the UE 115-d may send a model upload request message to the CU-CP 505 at 555. The model upload request message may include the neural network model and the set of parameters. In some examples, the UE 115-d may transmit the model upload request message via RRC signaling over SRB 2.

At 560, the CU-CP 505 may forward the model upload request to the CU-XP 510. The CU-XP 510 may then upload the neural network model and the set of parameters to the UE-MR 515 at 565. Similar to how the UE 115 uploads the neural network model and the set of parameter set in FIG. 4, the CU-XP 510 may construct addresses for the neural network models and the set of parameters using the model ID and parameter set ID and upload the neural network model and the set of parameters using the addresses to the UE-MR 515. Alternatively, the CU-XP 510 may obtain the addresses from another network entity (e.g., MDAC).

At 570, the CU-XP 510 may transmit a model upload response message to the CU-CP 505. The model download model response message may serve as a confirmation that the neural network model and the set of parameters were uploaded to the UE-MR 515.

At 575, the CU-CP 505 may forward the model download response message to the UE 115-d. In some example, the CU-CP 505 may send the model download response message to the UE 115-d via RRC signaling over a new SRB (e.g., SRB X).

Figure 6:
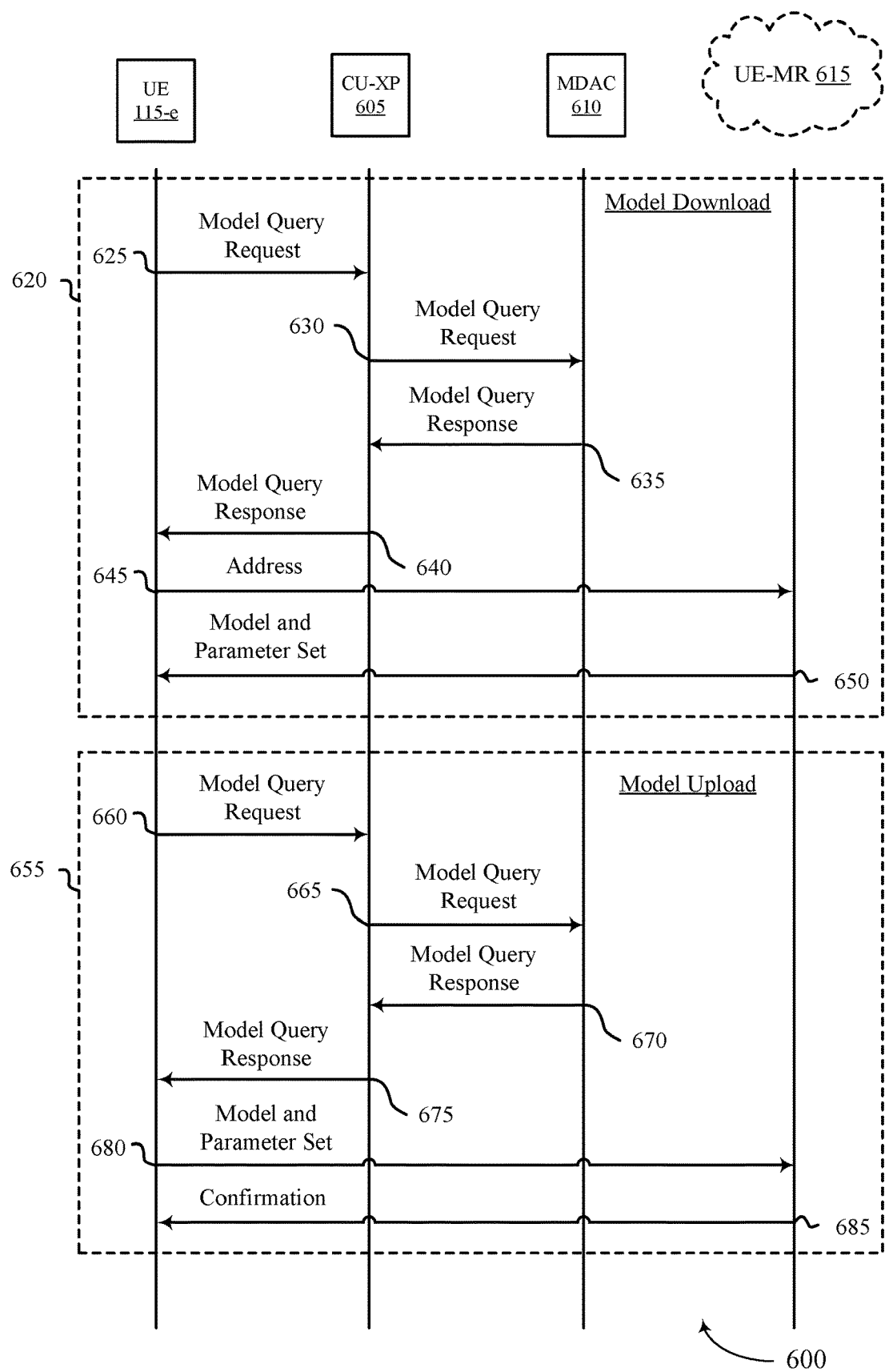

FIG. 6 illustrates an example of a process flow 600 that supports configuring a UE for machine learning in accordance with aspects of the present disclosure. In some examples, the process flow 600 may be implemented by aspects of a wireless communications system 100, a wireless communications system 201, a process flow 300, a process flow 400, or a process flow 500. For example, the process flow 500 may be performed by a UE 115-e, a CU-XP 605, and a UE-MR 615 which may be examples of a UE 115, a CU-XP 215, and a UE-MR 230 as described with reference to FIG. 2. The process flow 600 may support the upload and download of neural network models and parameter sets at the UE 115-*e*. Alternative examples of the following may be implemented, where some steps are performed in a different order then described or are not performed at all. In some cases, steps may include additional features not mentioned below, or further steps may be added.

As described with reference to FIG. 3, the network (e.g., a CU-CP or a CU-XP 605) may select a neural network function, a neural network model, and a corresponding set of parameters (e.g., based on a capability of the UE 115-*e* or based on a request message from the UE 115-*e*) and indicate the neural network function, the neural network model, and the corresponding set of parameters to the UE 115-*e* such that the UE 115-*e* may perform machine learning. For example, the network may transmit message (e.g., an RRC reconfiguration message) including a neural network function ID, a model ID, and a corresponding parameter set ID. The UE 115-*e* may then perform the following procedure to obtain the indicated neural network model and the corresponding set of parameters.

At 620, the UE 115-*e* may obtain the neural network model and the corresponding set of parameters from the network. First, the UE 115-*e* may send a model query request message to the CU-XP 605 at 625. The model query request message may include the model ID corresponding to the neural network model and the parameter set ID corresponding to the set of parameters.

At 630, the CU-XP 605 may forward the model query request message to the MDAC 610. In response to the model query request message, the MDAC 610 may send a model query response message to the CU-XP 605 at 635. The model query request message may include an address for the neural network model and an address for the set of parameters.

At 640, the CU-XP 605 may forward the model query response message to the UE 115-*e*. The UE 115-*e* may then send a message (e.g., a HTTP GET message) to the UE-MR including the address for the neural network model and the address for the set of parameters at 645. The UE-MR 615 may receive the message and send the neural network model and the set of parameters to the UE 115-*e* at 650. That is, the UE 115-*e* may download the neural network model and the set of parameters by the address from the UE-MR 615.

In some examples, the UE 115-*e* may not obtain the neural network model and the set of parameters from the UE-MR 615, but may obtain the neural network model and the set of parameters elsewhere (e.g., using a model training configuration). In such example, the UE 115-*e* may upload the neural network model and the set of parameters to the UE-MR 615 such that the UE-MR 615 may store the neural network models and the set of parameters for future use or such that other devices may access the neural network model and the set of parameters.

At 655, the UE 115-*e* may upload the neural network model and the set of parameters to the UE-MR 615 via one or more network nodes. For example, the UE 115-*e* may send a model query request message to the CU-XP 605 at 660. The model query request message may include the model ID associated with the neural network model and the parameter set ID associated with the set of parameters.

At 665, the CU-XP 510 may forward the model query request to the MDAC 610. In response to the model query request message, the MDAC 610 may send a model query response message to the CU-XP 605 at 670. The model query response message may include an address for the neural network model and an address for the set of parameters.

At 675, the CU-XP 605 may forward the model query response message to the UE 115-*e*. The UE 115-*e* may then send a message (e.g., a HTTP PUT message) to the UE-MR 615 including the neural network model and the set of parameters at 680. The UE-MR 615 may receive the message and a message confirming the upload of the neural network model and the set of parameters to the UE-MR 615 at 685. That is, the UE 115-*e* may upload the neural network model and the set of parameters by the address to the UE-MR 615.

Figure 7:
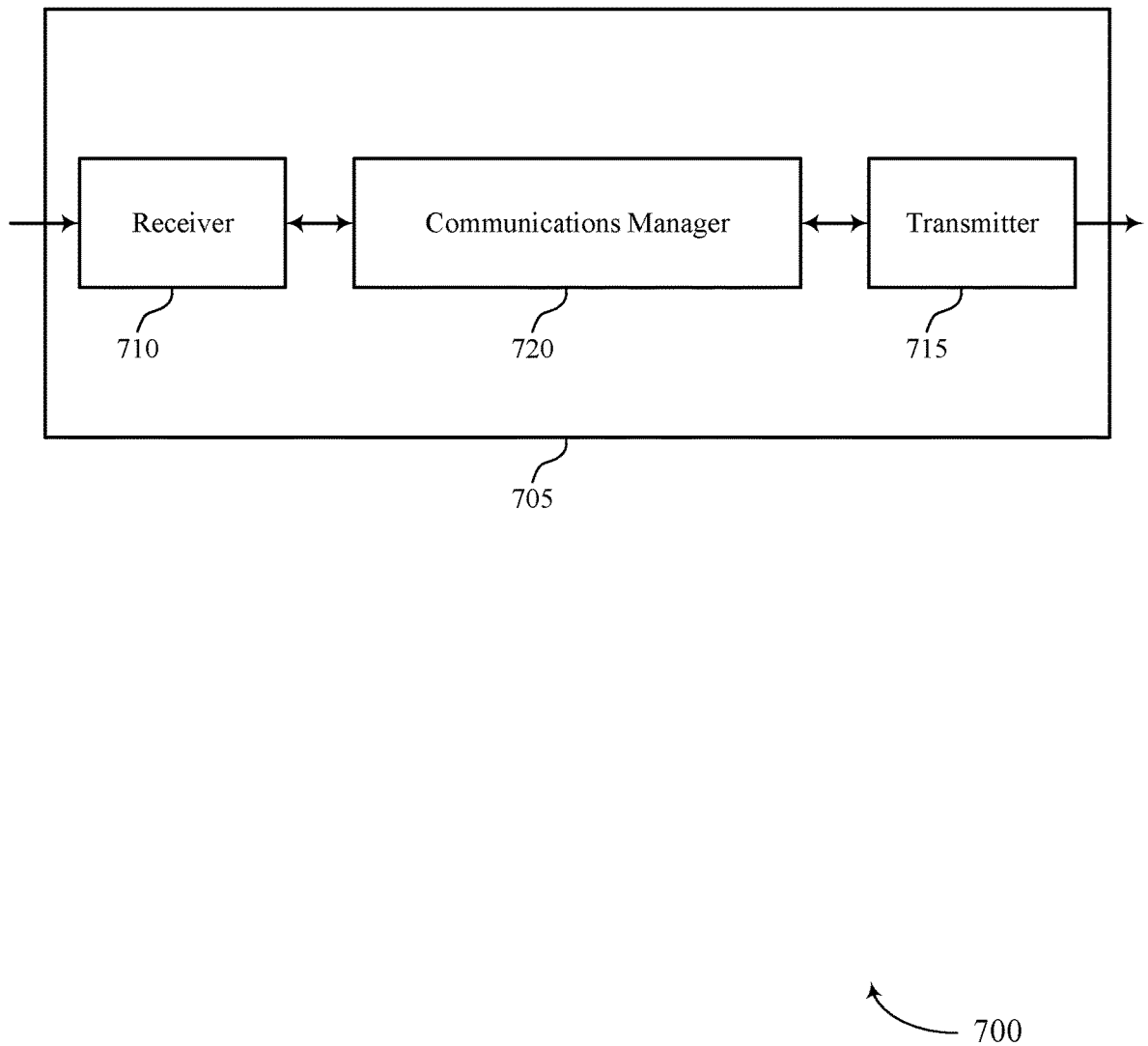
FIGS. 7 and 8 show block diagrams of devices that support configuring a UE for machine learning in accordance with aspects of the present disclosure.

FIG. 7 shows a block diagram 700 of a device 705 that supports configuring a UE for machine learning in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configuring a UE for machine learning). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configuring a UE for machine learning). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of configuring a UE for machine learning as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The communications manager 720 may be configured as or otherwise support a means for receiving, from the base station, an activation message for the machine learning model, the neural network function, or both.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption. The method as described herein may allow a device 705 to utilize machine learning for some communication procedures. Machine learning may allow the device 705 to perform the communications without explicit programming which may reduce power consumption at the UE.

Figure 8:
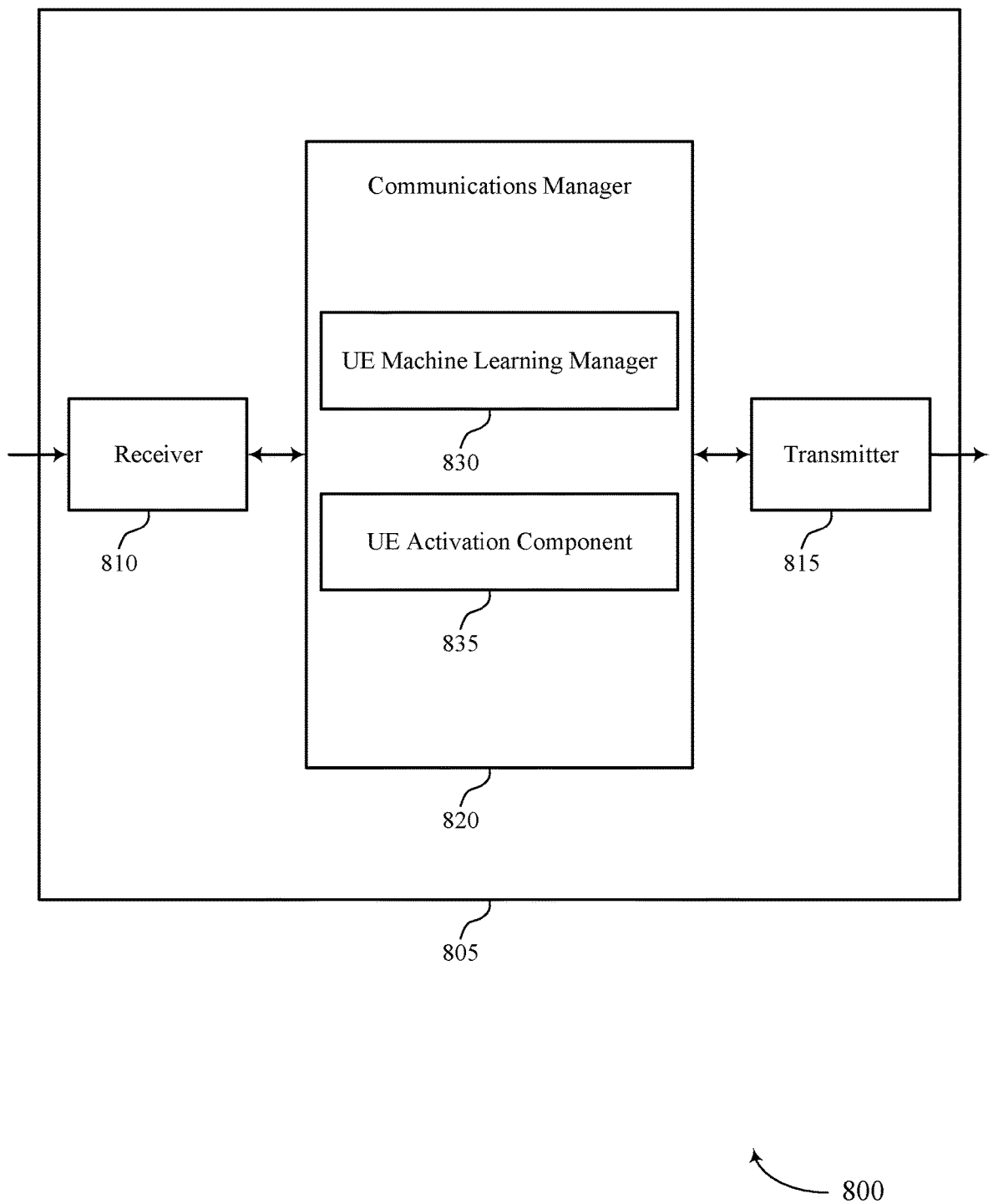

FIG. 8 shows a block diagram 800 of a device 805 that supports configuring a UE for machine learning in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to configuring a UE for machine learning). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to configuring a UE for machine learning). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of configuring a UE for machine learning as described herein. For example, the communications manager 820 may include a UE machine learning manager 830, a UE activation component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The UE machine learning manager 830 may be configured as or otherwise support a means for receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The UE activation component 835 may be configured as or otherwise support a means for receiving, from the base station, an activation message for the machine learning model, the neural network function, or both.

Figure 9:
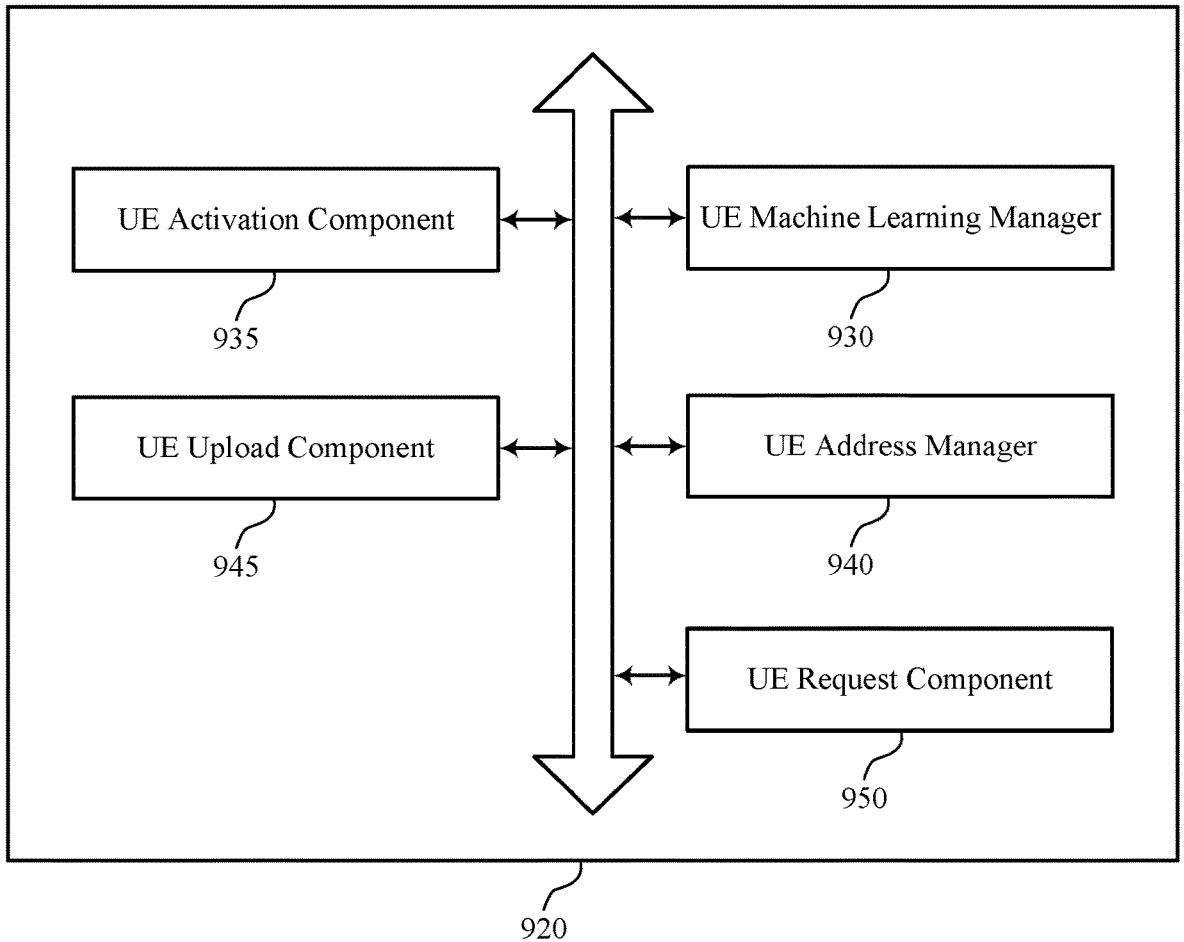
FIG. 9 shows a block diagram of a communications manager that supports configuring a UE for machine learning in accordance with aspects of the present disclosure.

FIG. 9 shows a block diagram 900 of a communications manager 920 that supports configuring a UE for machine learning in accordance with aspects of the present disclosure. The communications manager 920 may be an example of aspects of a communications manager 720, a communications manager 820, or both, as described herein. The communications manager 920, or various components thereof, may be an example of means for performing various aspects of configuring a UE for machine learning as described herein. For example, the communications manager 920 may include a UE machine learning manager 930, a UE activation component 935, a UE address manager 940, a UE upload component 945, a UE request component 950, or any combination thereof. Each of these components may communicate, directly or indirectly, with one another (e.g., via one or more buses).

The communications manager 920 may support wireless communication at a UE in accordance with examples as disclosed herein. The UE machine learning manager 930 may be configured as or otherwise support a means for receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The UE activation component 935 may be configured as or otherwise support a means for receiving, from the base station, an activation message for the machine learning model, the neural network function, or both.

In some examples, the UE request component 950 may be configured as or otherwise support a means for transmitting, to the base station, a request message that includes an indication of the machine learning model, the neural network function, or both, where receiving the machine learning model, the neural network function, or both is based on the request message. In some examples, the UE request component 950 may be configured as or otherwise support a means for receiving, from the base station, signaling indicating a first set of machine learning models included in a blacklist, a second set of machine learning models included in a whitelist, or both, where transmitting the request message is based on the machine learning model being included in the whitelist, excluded from the blacklist, or both.

In some examples, each machine learning model of the one or more machine learning models is associated with a respective scope corresponding to a location, a network slice, a DNN, a PLMN, a UE type, a RRC state, a communication service, a communication configuration, or any combination thereof and transmitting the request message based on a trigger event that includes the UE having a condition that is within the respective scope of the machine learning model.

In some examples, the request message includes an indication of the trigger event. In some examples, to support transmitting the request message, the UE request component 950 may be configured as or otherwise support a means for transmitting a UE assistance information message that includes the request message.

In some examples, to support transmitting the request message, the UE request component 950 may be configured as or otherwise support a means for transmitting RRC signaling that includes the request message.

In some examples, the UE address manager 940 may be configured as or otherwise support a means for determining an address for the machine learning model, the set of parameters, or the configuration based on an associated identifier and an associated rule, where receiving the machine learning model, the set of parameters, or the configuration is based on a download of the machine learning model, the set of parameters, or the configuration from the machine learning MR based on the address.

In some examples, the UE address manager 940 may be configured as or otherwise support a means for determining an address for a second machine learning model, a second set of parameters corresponding to the second machine learning model, or a second configuration corresponding to a second neural network function of the one or more neural network functions based on an associated identifier and an associated rule. In some examples, the UE upload component 945 may be configured as or otherwise support a means for initiating an upload of the second machine learning model, the second set of parameters, or the second configuration to the machine learning MR based on the address for the second machine learning model, the second set of parameters, or the second configuration.

In some examples, transmitting the request message includes transmitting the request message to a CU-CP entity included in the base station. In some examples, receiving the machine learning model, the set of parameters, or the configuration includes receiving the machine learning model, the set of parameters, or the configuration from the CU-CP entity.

In some examples, the UE address manager 940 may be configured as or otherwise support a means for receiving an address for the machine learning model, the set of parameters, or the configuration from a CU-XP entity included in the base station, where receiving the machine learning model, the set of parameters, or the configuration is based on a download of the machine learning model, the set of parameters, or the configuration from the machine learning MR based on the address.

In some examples, the UE address manager 940 may be configured as or otherwise support a means for receiving an address for a second machine learning model, a second set of parameters corresponding to the second machine learning model, or a second configuration corresponding to a second neural network function of the one or more neural network functions from a CU-XP entity included in the base station. In some examples, the UE upload component 945 may be configured as or otherwise support a means for initiating an upload of the second machine learning model, the second set of parameters, or the second configuration to the machine learning MR based on the address for the second machine learning model, the second set of parameters, or the second configuration.

Figure 10:
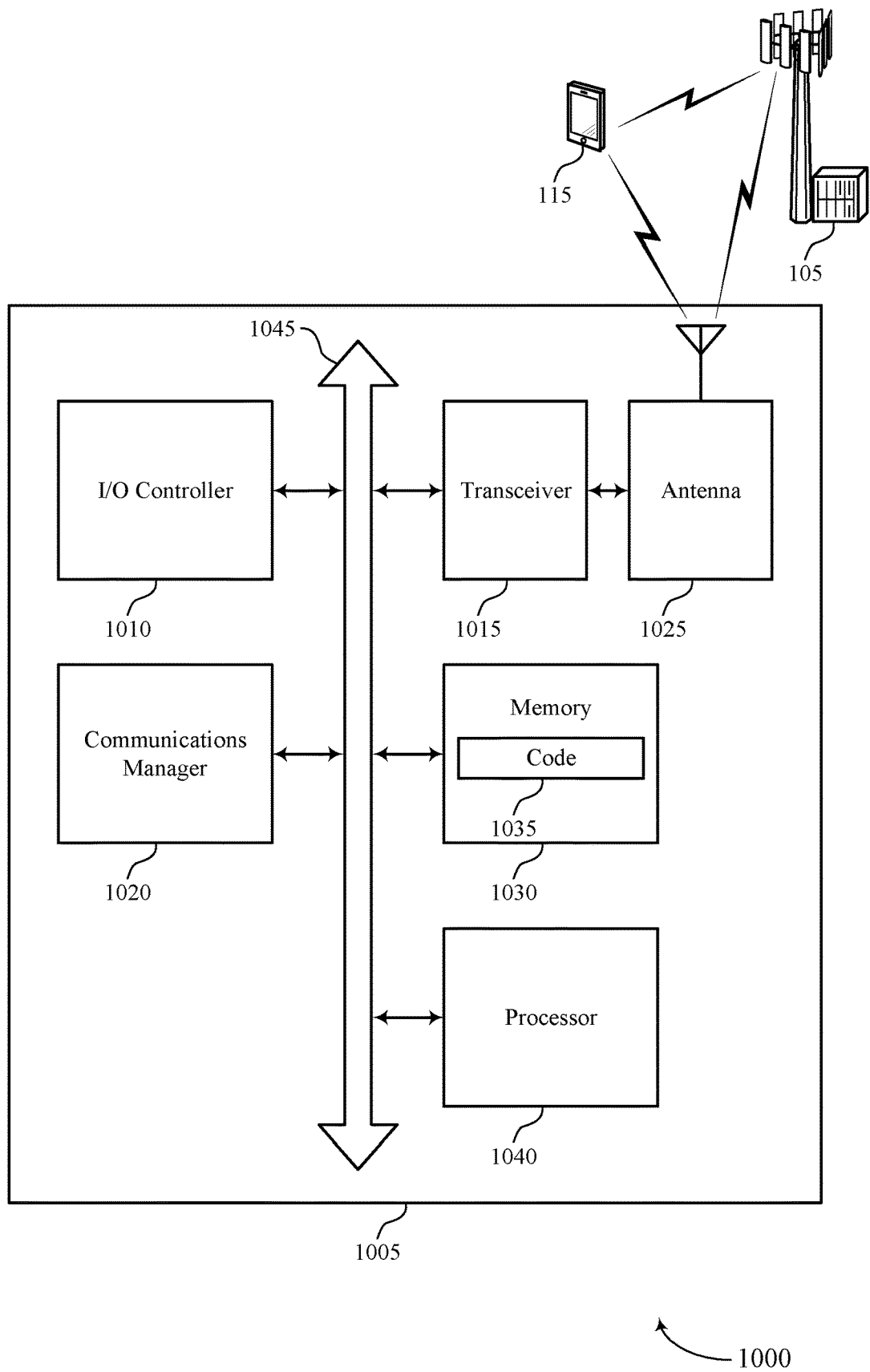
FIG. 10 shows a diagram of a system including a device that supports configuring a UE for machine learning in accordance with aspects of the present disclosure.

FIG. 10 shows a diagram of a system 1000 including a device 1005 that supports configuring a UE for machine learning in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuring a UE for machine learning). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The communications manager 1020 may be configured as or otherwise support a means for receiving, from the base station, an activation message for the machine learning model, the neural network function, or both.

By including or configuring the communications manager 1020 in accordance with examples as described herein, the device 1005 may support techniques for reduced power consumption and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of configuring a UE for machine learning as described herein, or the processor 1040 and the memory 1030 may be otherwise configured to perform or support such operations.

Figure 11:
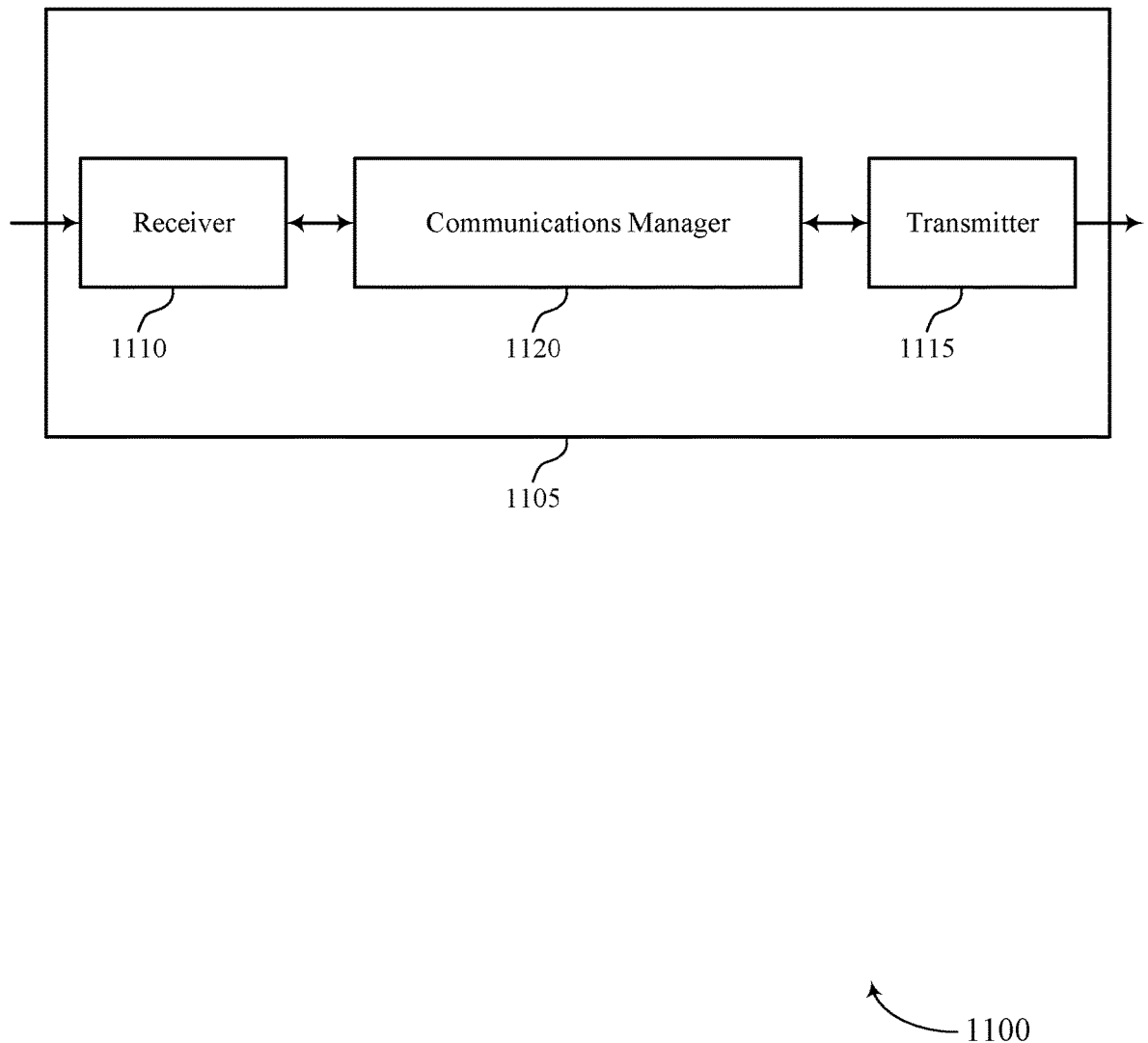
FIGS. 11 and 12 show block diagrams of devices that support configuring a UE for machine learning in accordance with aspects of the present disclosure.

FIG. 11 shows a block diagram 1100 of a device 1105 that supports configuring a UE for machine learning in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configuring a UE for machine learning). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configuring a UE for machine learning). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of configuring a UE for machine learning as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor.

If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station. The communications manager 1120 may be configured as or otherwise support a means for transmitting, to the UE, an activation message for the machine learning model, the neural network function, or both.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing and reduced power consumption.

Figure 12:
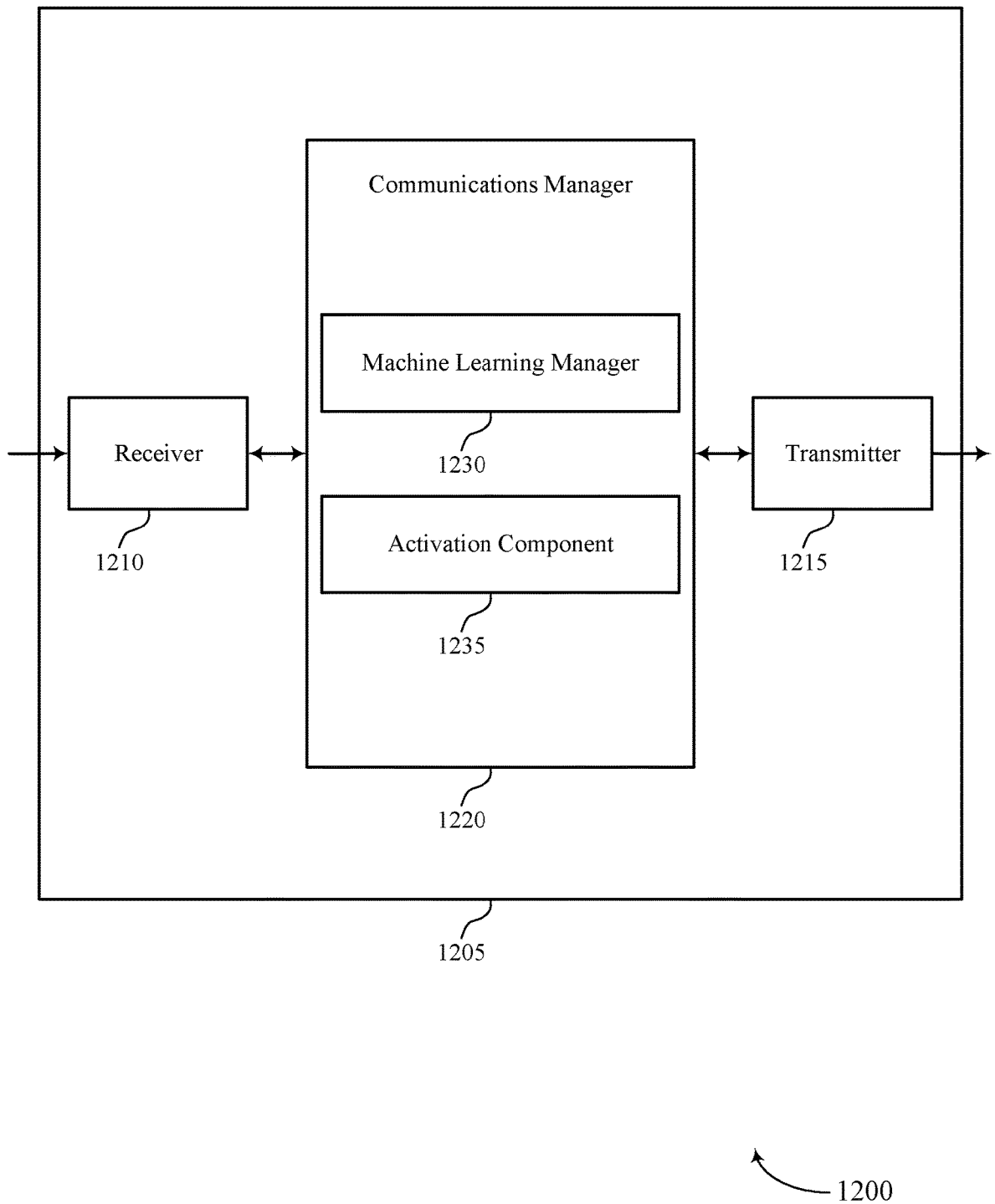

FIG. 12 shows a block diagram 1200 of a device 1205 that supports configuring a UE for machine learning in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to configuring a UE for machine learning). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to configuring a UE for machine learning). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of configuring a UE for machine learning as described herein. For example, the communications manager 1220 may include a machine learning manager 1230, an activation component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The machine learning manager 1230 may be configured as or otherwise support a means for transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The activation component 1235 may be configured as or otherwise support a means for transmitting, to the UE, an activation message for the machine learning model, the neural network function, or both.

Figure 13:
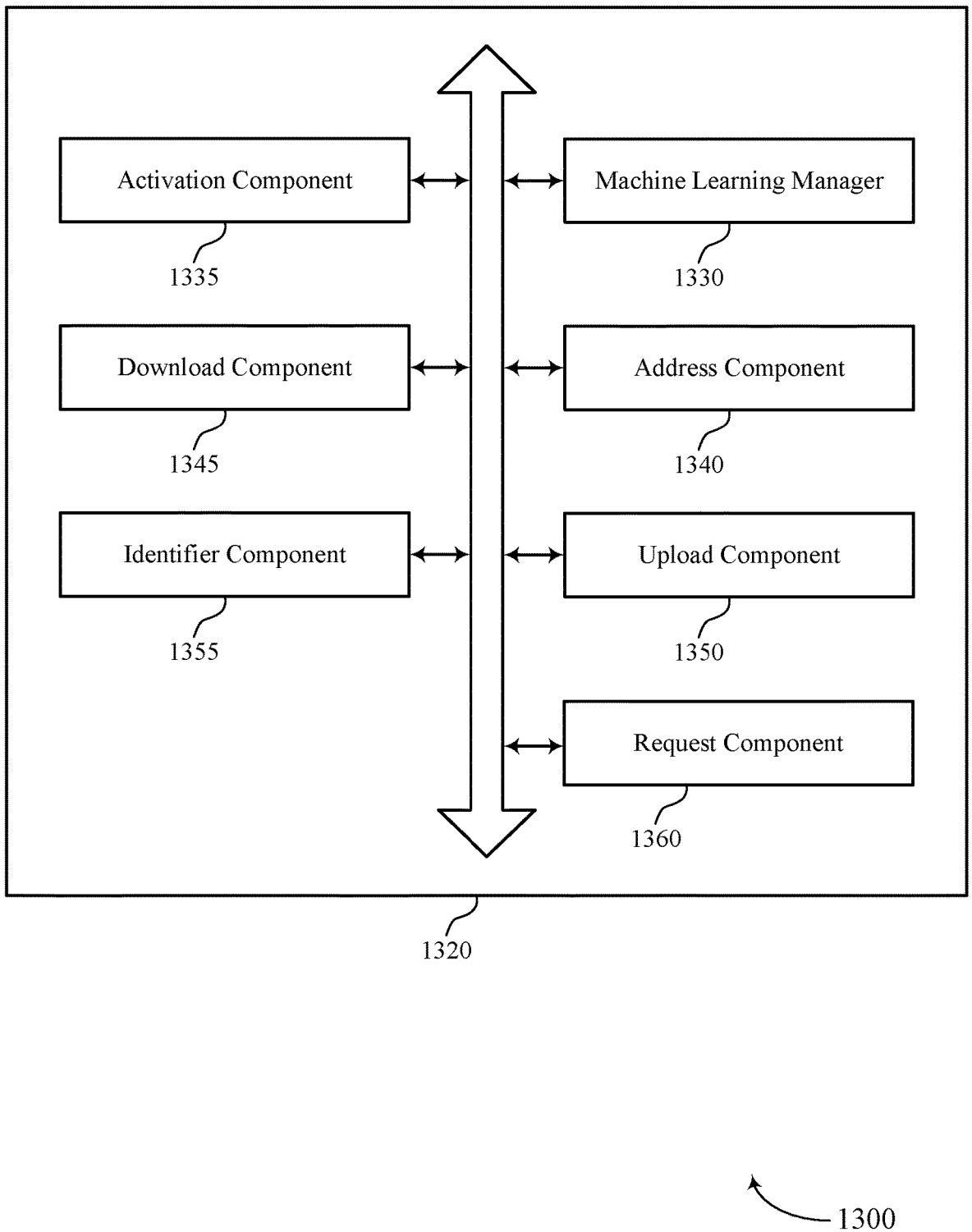
FIG. 13 shows a block diagram of a communications manager that supports configuring a UE for machine learning in accordance with aspects of the present disclosure.

FIG. 13 shows a block diagram 1300 of a communications manager 1320 that supports configuring a UE for machine learning in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of configuring a UE for machine learning as described herein. For example, the communications manager 1320 may include a machine learning manager 1330, an activation component 1335, an address component 1340, a download component 1345, an upload component 1350, an identifier component 1355, a request component 1360, or any combination thereof. Each of these components may communicate, directly or indirectly, with one another (e.g., via one or more buses).

The communications manager 1320 may support wireless communication at a base station in accordance with examples as disclosed herein. The machine learning manager 1330 may be configured as or otherwise support a means for transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station. The activation component 1335 may be configured as or otherwise support a means for transmitting, to the UE, an activation message for the machine learning model, the neural network function, or both.

In some examples, the request component 1360 may be configured as or otherwise support a means for receiving, from the UE, a request message that includes an indication of the machine learning model, the neural network function, or both, where transmitting the machine learning model, the neural network function, or both based on the request message. In some examples, the request component 1360 may be configured as or otherwise support a means for transmitting, to the UE, signaling indicating a first set of machine learning models included in a blacklist, a second set of machine learning models included in a whitelist, or both, where the machine learning model is included in the whitelist, excluded from the blacklist, or both. In some examples, the request message includes an indication of the trigger event.

In some examples, each machine learning model of the one or more machine learning models is associated with a respective scope corresponding to a location, a network slice, a DNN, a PLMN, a UE type, a RRC state, a communication service, a communication configuration, or any combination thereof and receiving the request message based on a trigger event that includes the UE having a condition that is within the respective scope of the machine learning model.

In some examples, to support receiving the request message, the request component 1360 may be configured as or otherwise support a means for receiving a UE assistance information message that includes the request message.

In some examples, to support receiving the request message, the request component 1360 may be configured as or otherwise support a means for receiving RRC signaling that includes the request message.

In some examples, the address component 1340 may be configured as or otherwise support a means for receiving, from the UE, an address for the machine learning model, the set of parameters, or the configuration. In some examples, the download component 1345 may be configured as or otherwise support a means for downloading, for the UE, the machine learning model, the set of parameters, or the configuration from the machine learning MR based on the address.

In some examples, the address component 1340 may be configured as or otherwise support a means for receiving, from the UE, an address for a second machine learning model, a second set of parameters corresponding to the second machine learning model, or a second configuration corresponding to a second neural network function of the one or more neural network functions. In some examples, the upload component 1350 may be configured as or otherwise support a means for uploading the second machine learning model, the second set of parameters, or the second configuration to the machine learning MR.

In some examples, the request component 1360 may be configured as or otherwise support a means for receiving the request message at a CU-CP entity included in the base station. In some examples, the request component 1360 may be configured as or otherwise support a means for forwarding the request message from the CU-CP entity to a CU-XP entity included in the base station. In some examples, the download component 1345 may be configured as or otherwise support a means for downloading, to the CU-CP entity, the machine learning model, the set of parameters, or the configuration from the machine learning MR based on the request message, where transmitting the machine learning model, the set of parameters, or the configuration to the UE is based on the downloading.

In some examples, the identifier component 1355 may be configured as or otherwise support a means for receiving, from the UE at a CU-XP entity included in the base station, an identifier associated with the machine learning model, the set of parameters, or the configuration. In some examples, the address component 1340 may be configured as or otherwise support a means for determining an address for the machine learning model, the set of parameters, or the configuration based at least in part on the identifier. In some examples, the download component 1345 may be configured as or otherwise support a means for downloading, for the UE, the machine learning model, the set of parameters, or the configuration from the machine learning MR based on the address, where transmitting the machine learning model, the set of parameters, or the configuration to the UE is based on the downloading.

In some examples, the identifier component 1355 may be configured as or otherwise support a means for receiving, from the UE at a CU-XP entity included in the base station, an identifier associated with a second machine learning model, a second set of parameters corresponding to the second machine learning model, or a second configuration corresponding to a second neural network function of the one or more neural network functions. In some examples, the address component 1340 may be configured as or otherwise support a means for determining an address for the second machine learning model, the second set of parameters, or the second configuration based at least in part on the identifier. In some examples, the upload component 1350 may be configured as or otherwise support a means for uploading, to the machine learning MR, the second machine learning model, the second set of parameters, or the second configuration based on the address.

Figure 14:
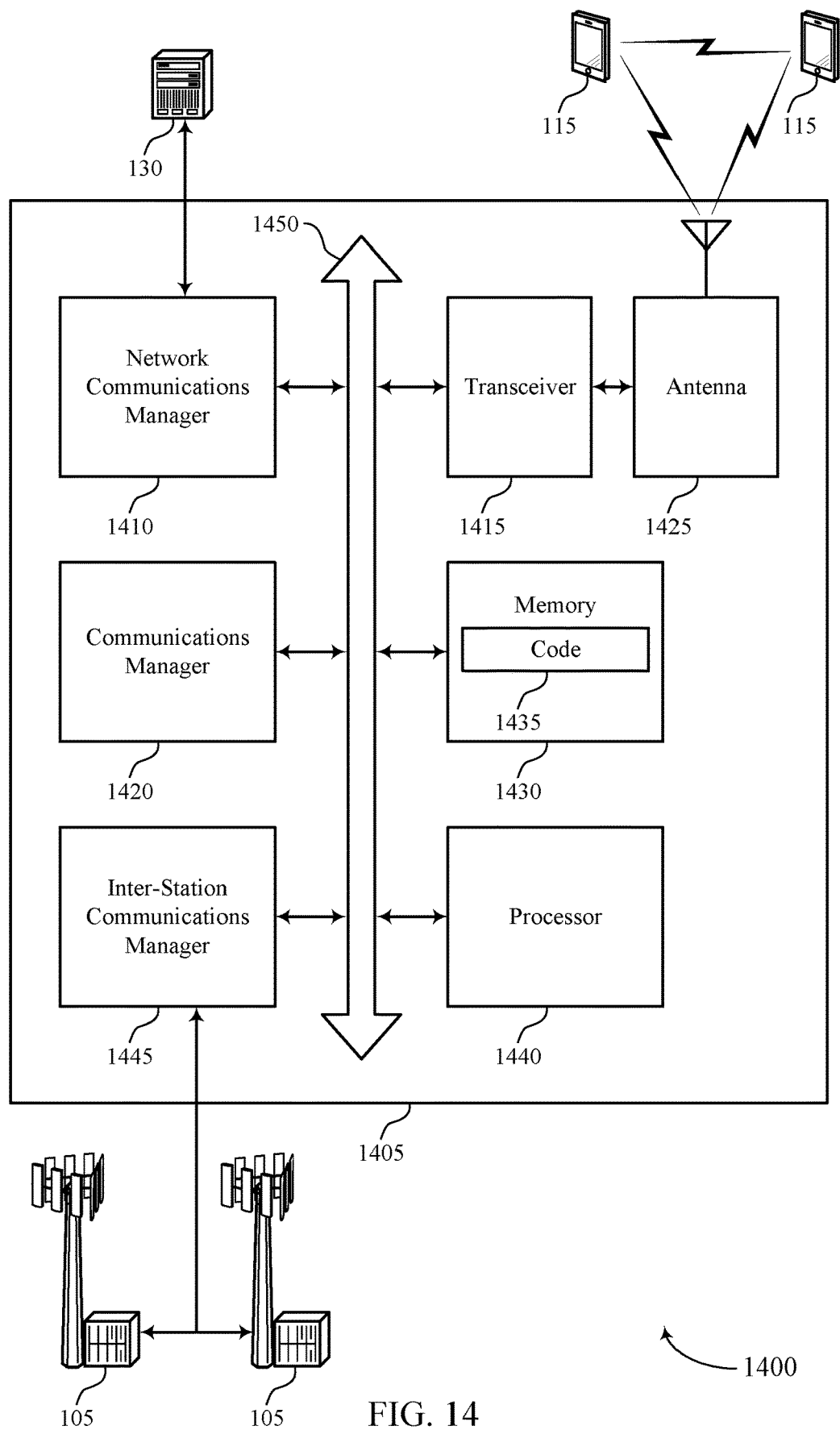
FIG. 14 shows a diagram of a system including a device that supports configuring a UE for machine learning in accordance with aspects of the present disclosure.

FIG. 14 shows a diagram of a system 1400 including a device 1405 that supports configuring a UE for machine learning in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting configuring a UE for machine learning). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station. The communications manager 1420 may be configured as or otherwise support a means for transmitting, to the UE, an activation message for the machine learning model, the neural network function, or both.

By including or configuring the communications manager 1420 in accordance with examples as described herein, the device 1405 may support techniques for reduced power consumption and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of configuring a UE for machine learning as described herein, or the processor 1440 and the memory 1430 may be otherwise configured to perform or support such operations.

Figure 15:
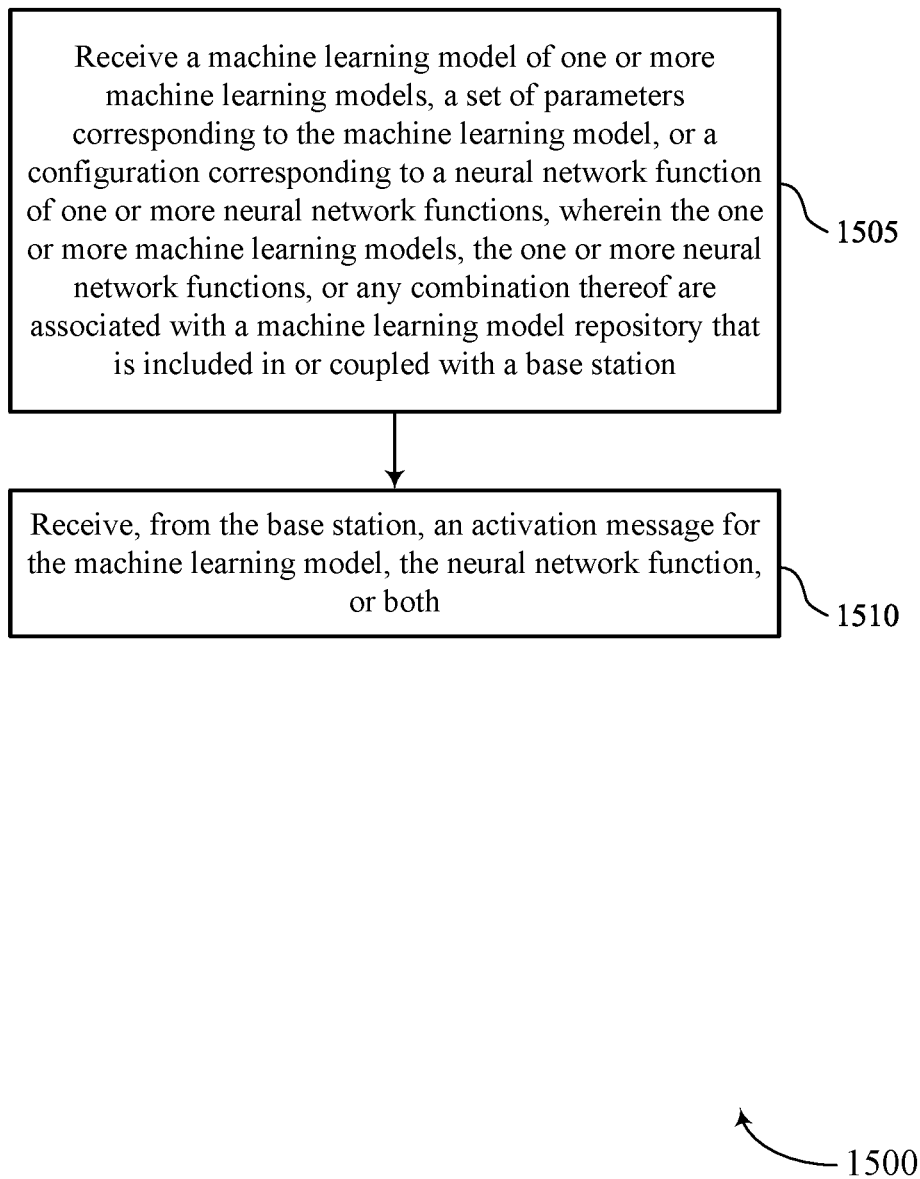
FIGS. 15 through 18 show flowcharts illustrating methods that support configuring a UE for machine learning in accordance with aspects of the present disclosure.

FIG. 15 shows a flowchart illustrating a method 1500 that supports configuring a UE for machine learning in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with a base station. The operations of 1505 may be performed in accordance with examples as disclosed herein. In some examples, aspects of the operations of 1505 may be performed by a UE machine learning manager 930 as described with reference to FIG. 9.

At 1510, the method may include receiving, from the base station, an activation message for the machine learning model, the neural network function, or both. The operations of 1510 may be performed in accordance with examples as disclosed herein. In some examples, aspects of the operations of 1510 may be performed by a UE activation component 935 as described with reference to FIG. 9.

Figure 16:
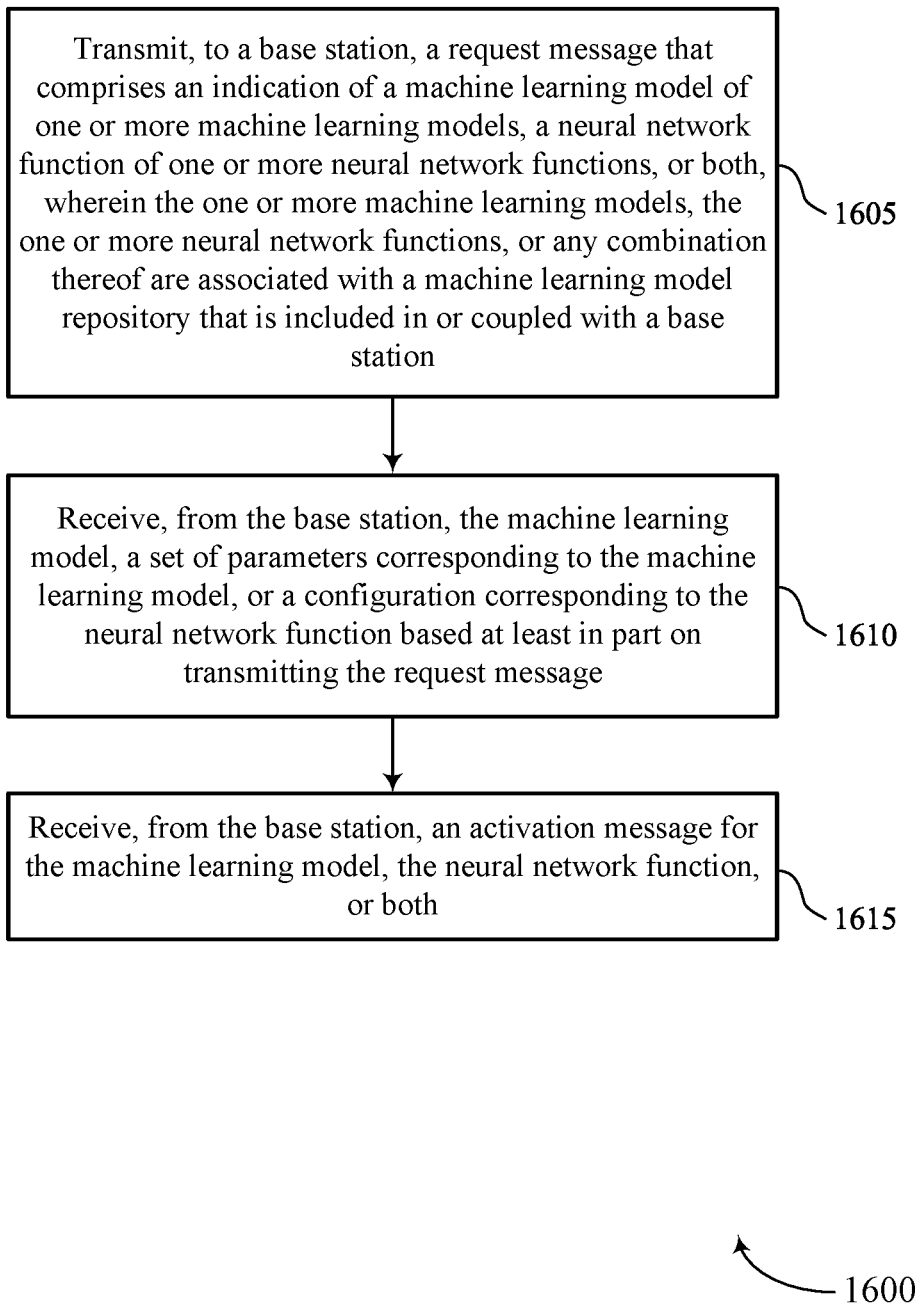

FIG. 16 shows a flowchart illustrating a method 1600 that supports configuring a UE for machine learning in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a request message that comprises an indication of a machine learning model of one or more machine learning models, a neural network function of one or more neural network functions, or both, wherein the one or more machine learning models, the one or more neural network functions, or any combination thereof are associated with a machine learning model repository that is included in or coupled with a base station. The operations of 1605 may be performed in accordance with examples as disclosed herein. In some examples, aspects of the operations of 1605 may be performed by a UE request component 950 as described with reference to FIG. 9.

At 1610, the method may include receiving, from the base station, the machine learning model, a set of parameters corresponding to the machine learning model, or a configuration corresponding to the neural network function based at least in part on transmitting the request message. The operations of 1610 may be performed in accordance with examples as disclosed herein. In some examples, aspects of the operations of 1610 may be performed by a UE machine learning manager 930 as described with reference to FIG. 9.

At 1615, the method may include receiving, from the base station, an activation message for the machine learning model, the neural network function, or both. The operations of 1615 may be performed in accordance with examples as disclosed herein. In some examples, aspects of the operations of 1615 may be performed by a UE activation component 935 as described with reference to FIG. 9.

Figure 17:
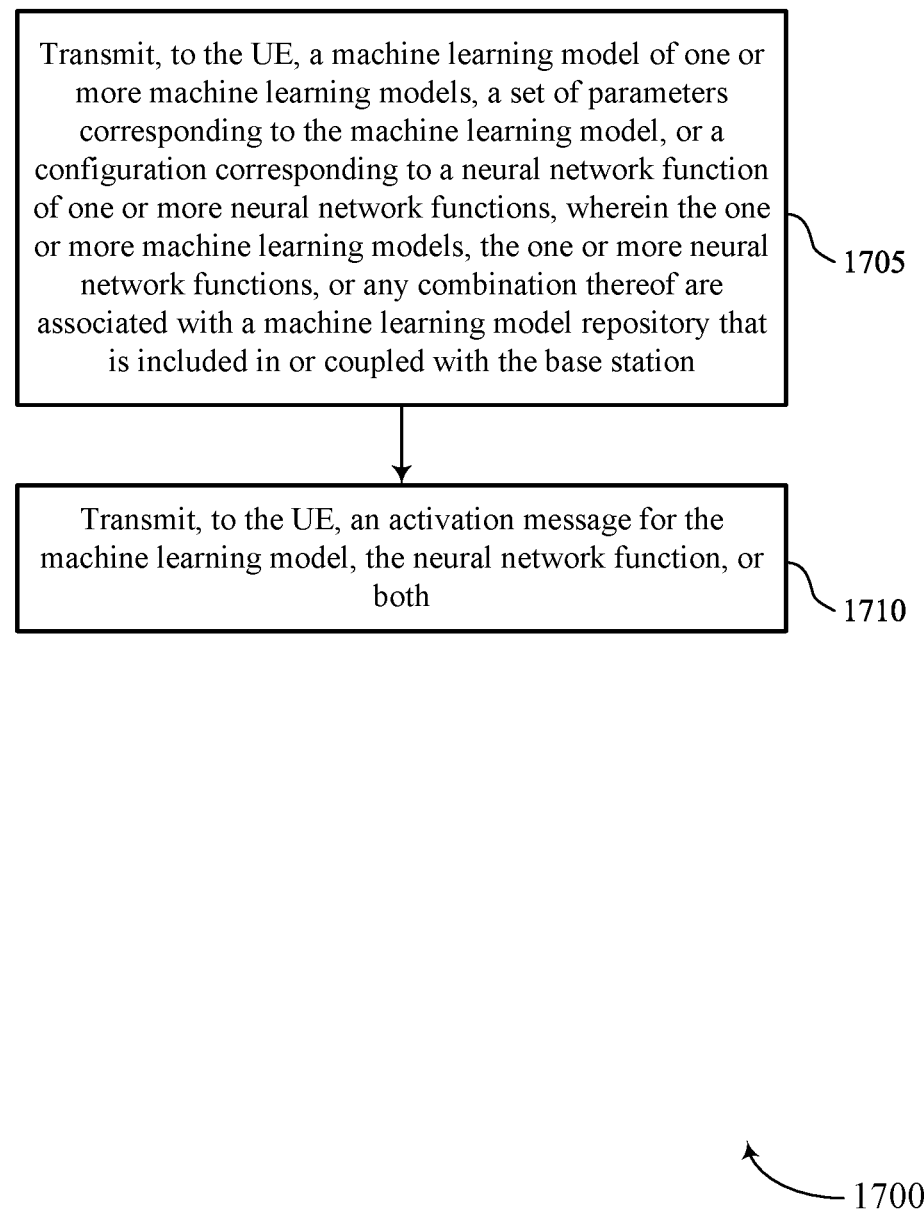

FIG. 17 shows a flowchart illustrating a method 1700 that supports configuring a UE for machine learning in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to the UE, a machine learning model of one or more machine learning models, a set of parameters corresponding to the machine learning model, or a configuration corresponding to a neural network function of one or more neural network functions, where the one or more machine learning models, the one or more neural network functions, or any combination thereof may be associated with a machine learning MR that is included in or coupled with the base station. The operations of 1705 may be performed in accordance with examples as disclosed herein. In some examples, aspects of the operations of 1705 may be performed by a machine learning manager 1330 as described with reference to FIG. 13.

At 1710, the method may include transmitting, to the UE, an activation message for the machine learning model, the neural network function, or both. The operations of 1710 may be performed in accordance with examples as disclosed herein. In some examples, aspects of the operations of 1710 may be performed by an activation component 1335 as described with reference to FIG. 13.

Figure 18:
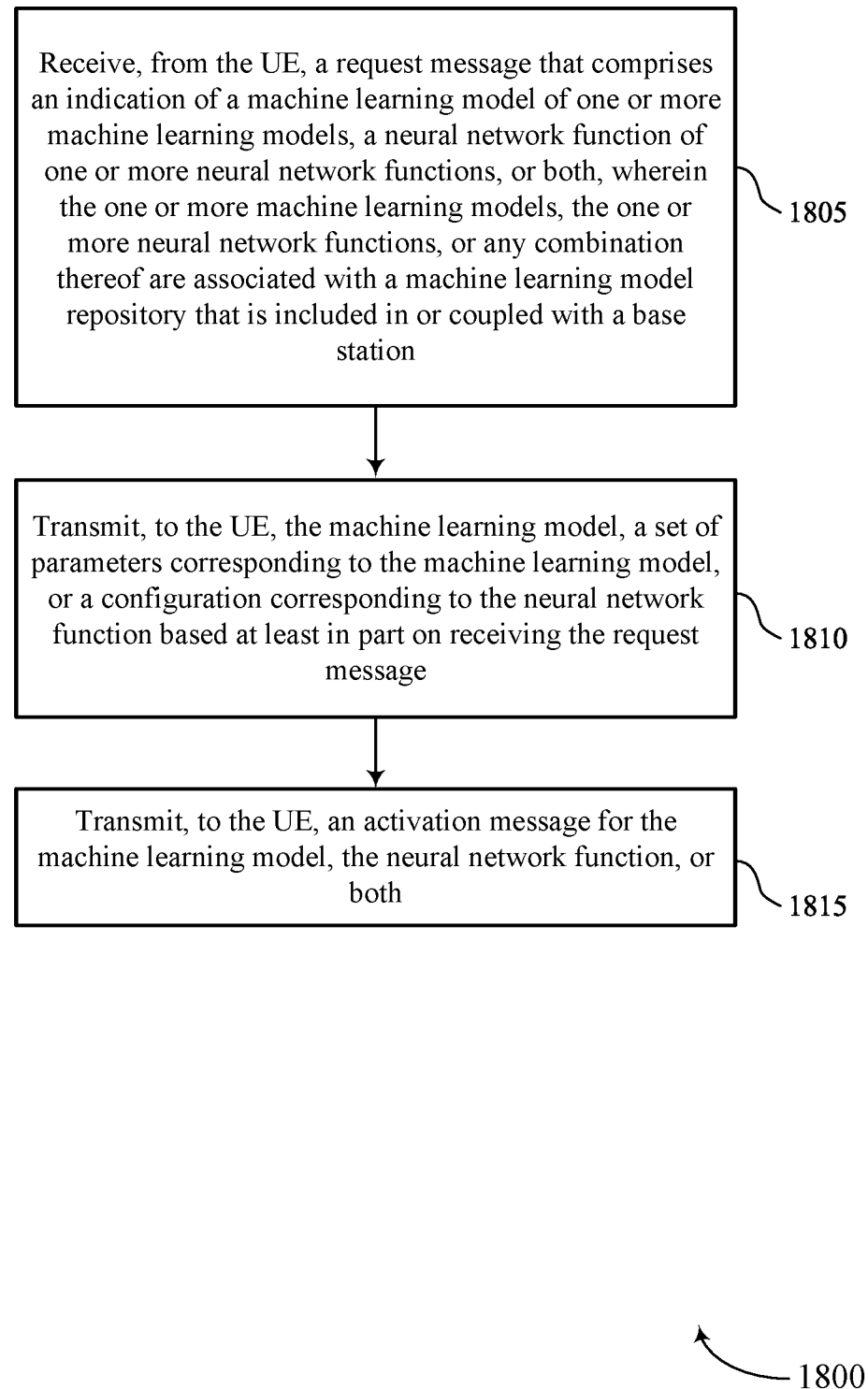

FIG. 18 shows a flowchart illustrating a method 1800 that supports configuring a UE for machine learning in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from the UE, a request message that comprises an indication of a machine learning model of one or more machine learning models, a neural network function of one or more neural network functions, or both, wherein the one or more machine learning models, the one or more neural network functions, or any combination thereof are associated with a machine learning model repository that is included in or coupled with a base station. The operations of 1805 may be performed in accordance with examples as disclosed herein. In some examples, aspects of the operations of 1805 may be performed by a request component 1360 as described with reference to FIG. 13.

At 1810, the method may include transmitting, to the UE, the machine learning model, a set of parameters corresponding to the machine learning model, or a configuration corresponding to the neural network function based at least in part on receiving the request message. The operations of 1810 may be performed in accordance with examples as disclosed herein. In some examples, aspects of the operations of 1810 may be performed by a machine learning manager 1330 as described with reference to FIG. 13.

At 1815, the method may include transmitting, to the UE, an activation message for the machine learning model, the neural network function, or both. The operations of 1815 may be performed in accordance with examples as disclosed herein. In some examples, aspects of the operations of 1815 may be performed by an activation component 1335 as described with reference to FIG. 13.

The following provides an overview of aspects of the present disclosure:

Aspect 1: A method for wireless communication at a UE, comprising: receiving a machine learning model of one or more machine learning models, a set of parameters corresponding to the machine learning model, or a configuration corresponding to a neural network function of one or more neural network functions, wherein the one or more machine learning models, the one or more neural network functions, or any combination thereof are associated with a machine learning MR that is included in or coupled with a base station; and receiving, from the base station, an activation message for the machine learning model, the neural network function, or both.

Aspect 2: The method of aspect 1, further comprising: transmitting, to the base station, a request message that comprises an indication of the machine learning model, the neural network function, or both, wherein receiving the machine learning model, the neural network function, or both is based at least in part on the request message.

Aspect 3: The method of aspect 2, further comprising: receiving, from the base station, signaling indicating a first set of machine learning models included in a blacklist, a second set of machine learning models included in a whitelist, or both, wherein transmitting the request message is based at least in part on the machine learning model being included in the whitelist, excluded from the blacklist, or both.

Aspect 4: The method of any of aspects 2 through 3, wherein each machine learning model of the one or more machine learning models is associated with a respective scope corresponding to a location, a network slice, a DNN, a PLMN, a UE type, a RRC state, a communication service, a communication configuration, or any combination thereof and transmitting the request message is based at least in part on a trigger event that comprises the UE having a condition that is within the respective scope of the machine learning model.

Aspect 5: The method of aspect 4, wherein the request message comprises an indication of the trigger event.

Aspect 6: The method of any of aspects 2 through 5, wherein transmitting the request message comprises: transmitting a UE assistance information message that comprises the request message.

Aspect 7: The method of any of aspects 2 through 6, wherein transmitting the request message comprises: transmitting RRC signaling that comprises the request message.

Aspect 8: The method of any of aspects 2 through 7, wherein transmitting the request message comprises transmitting the request message to a CU-CP entity included in the base station; and receiving the machine learning model, the set of parameters, or the configuration comprises receiving the machine learning model, the set of parameters, or the configuration from the CU-CP entity.

Aspect 9: The method of any of aspects 1 through 7, further comprising: determining an address for the machine learning model, the set of parameters, or the configuration based at least in part on an associated ID and an associated rule, wherein receiving the machine learning model, the set of parameters, or the configuration is based at least in part on a download of the machine learning model, the set of parameters, or the configuration from the machine learning MR based at least in part on the address.

Aspect 10: The method of any of aspects 1 through 7, further comprising: determining an address for a second machine learning model, a second set of parameters corresponding to the second machine learning model, or a second configuration corresponding to a second neural network function of the one or more neural network functions based at least in part on an associated ID and an associated rule; and initiating an upload of the second machine learning model, the second set of parameters, or the second configuration to the machine learning MR based at least in part on the address for the second machine learning model, the second set of parameters, or the second configuration.

Aspect 11: The method of any of aspects 1 through 7, further comprising: receiving an address for the machine learning model, the set of parameters, or the configuration from a CU-XP entity included in the base station, wherein receiving the machine learning model, the set of parameters, or the configuration is based at least in part on a download of the machine learning model, the set of parameters, or the configuration from the machine learning MR based at least in part on the address.

Aspect 12: The method of any of aspects 1 through 7, further comprising: receiving an address for a second machine learning model, a second set of parameters corresponding to the second machine learning model, or a second configuration corresponding to a second neural network function of the one or more neural network functions from a CU-XP entity included in the base station; and initiating an upload of the second machine learning model, the second set of parameters, or the second configuration to the machine learning MR based at least in part on the address for the second machine learning model, the second set of parameters, or the second configuration.

Aspect 13: A method for wireless communication at a base station, comprising: transmitting, to the UE, a machine learning model of one or more machine learning models, a set of parameters corresponding to the machine learning model, or a configuration corresponding to a neural network function of one or more neural network functions, wherein the one or more machine learning models, the one or more neural network functions, or any combination thereof are associated with a machine learning MR that is included in or coupled with the base station; and transmitting, to the UE, an activation message for the machine learning model, the neural network function, or both.

Aspect 14: The method of aspect 13, further comprising: receiving, from the UE, a request message that includes an indication of the machine learning model, the neural network function, or both, wherein transmitting the machine learning model, the neural network function, or both is based at least in part on the request message.

Aspect 15: The method of aspect 14, further comprising: transmitting, to the UE, signaling indicating a first set of machine learning models included in a blacklist, a second set of machine learning models included in a whitelist, or both, wherein the machine learning model is included in the whitelist, excluded from the blacklist, or both.

Aspect 16: The method of any of aspects 14 through 15, wherein each machine learning model of the one or more machine learning models is associated with a respective scope corresponding to a location, a network slice, a DNN, a PLMN, a UE type, a RRC state, a communication service, a communication configuration, or any combination thereof and receiving the request message is based at least in part on a trigger event that comprises the UE having a condition that is within the respective scope of the machine learning model.

Aspect 17: The method of aspect 16, wherein the request message comprises an indication of the trigger event.

Aspect 18: The method of any of aspects 14 through 17, wherein receiving the request message comprises: receiving a UE assistance information message that comprises the request message.

Aspect 19: The method of any of aspects 14 through 18, wherein receiving the request message comprises: receiving RRC signaling that comprises the request message.

Aspect 20: The method of any of aspects 14 through 19, further comprising: receiving the request message at a CU-CP entity included in the base station; forwarding the request message from the CU-CP entity to a CU-XP entity included in the base station; and downloading, to the CU-CP entity, the machine learning model, the set of parameters, or the configuration from the machine learning MR based at least in part on the request message, wherein transmitting the machine learning model, the set of parameters, or the configuration to the UE is based at least in part on the downloading.

Aspect 21: The method of any of aspects 13 through 19, further comprising: receiving, from the UE, an address for the machine learning model, the set of parameters, or the configuration; and downloading, for the UE, the machine learning model, the set of parameters, or the configuration from the machine learning MR based at least in part on the address.

Aspect 22: The method of any of aspects 13 through 19, further comprising: receiving, from the UE, an address for a second machine learning model, a second set of parameters corresponding to the second machine learning model, or a second configuration corresponding to a second neural network function of the one or more neural network functions; and uploading the second machine learning model, the second set of parameters, or the second configuration to the machine learning MR.

Aspect 23: The method of any of aspects 13 through 19, further comprising: receiving, from the UE at a CU-XP entity included in the base station, an ID associated with the machine learning model, the set of parameters, or the configuration; determining an address for the machine learning model, the set of parameters, or the configuration based at least in part on the ID; and downloading, for the UE, the machine learning model, the set of parameters, or the configuration from the machine learning MR based at least in part on the address, wherein transmitting the machine learning model, the set of parameters, or the configuration to the UE is based at least in part on the downloading.

Aspect 24: The method of any of aspects 13 through 19, further comprising: receiving, from the UE at a CU-XP entity included in the base station, an ID associated with a second machine learning model, a second set of parameters corresponding to the second machine learning model, or a second configuration corresponding to a second neural network function of the one or more neural network functions; determining an address for the second machine learning model, the second set of parameters, or the second configuration based at least in part on the ID; and uploading, to the machine learning MR, the second machine learning model, the second set of parameters, or the second configuration based at least in part on the address.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shell be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   transmit capability information that corresponds to one or more neural network functions, one or more machine learning models, or any combination thereof; and
   receive a machine learning configuration corresponding to a neural network function of the one or more neural network functions or a machine learning model of the one or more machine learning models, wherein:
   the machine learning configuration corresponding to the one or more neural network functions is based at least in part on the capability information, and
   the one or more machine learning models, the one or more neural network functions, or any combination thereof are associated with a machine learning model repository that is included in or coupled with a network entity,
   wherein, the neural network function or the machine learning model is to be activated based on an associated activation function.

2. The UE of claim 1, wherein the one or more processors are individually or collectively further operable to execute the code to cause the UE to:
   transmit, to the network entity, a request message that comprises an indication of the machine learning model, the neural network function, or both, wherein the one or more processors are individually or collectively operable to execute the code to cause the UE to receive the machine learning configuration based at least in part on the request message.

3. The UE of claim 2, wherein:
   to transmit the request message, the one or more processors are individually or collectively operable to execute the code to cause the UE to transmit the request message to a central unit-control plane entity that comprises or is associated with the network entity; and
   to receive the machine learning configuration, the one or more processors are individually or collectively operable to execute the code to cause the UE to receive the machine learning configuration from the central unit-control plane entity.

4. The UE of claim 3, wherein the one or more processors are individually or collectively further operable to execute the code to cause the UE to:
   receive, from the network entity, signaling indicating a first set of neural network functions or machine learning models included in a blacklist, a second set of neural network functions or machine learning models included in a whitelist, or both, wherein the one or more processors are individually or collectively operable to execute the code to cause the UE to transmit the request message based at least in part on the neural network function or the machine learning model being included in the whitelist, excluded from the blacklist, or both.

5. The UE of claim 1, wherein:
   to receive the machine learning configuration, the one or more processors are individually or collectively operable to execute the code to cause the UE to receive the machine learning configuration via a machine learning control protocol layer.

6. The UE of claim 1, wherein the neural network function or the machine learning model is associated with an identifier, and wherein the one or more processors are individually or collectively operable to execute the code to cause the UE to receive the machine learning configuration based least in part on the identifier.

7. The UE of claim 6, wherein, to receive the machine learning configuration, the one or more processors are individually or collectively operable to execute the code to cause the UE to:
  download the neural network function or the machine learning model from the machine learning model repository based at least in part on the identifier.

8. The UE of claim 6, wherein the one or more processors are individually or collectively further operable to execute the code to cause the UE to:
  receive an indication of the identifier associated with the machine learning configuration via a central unit-machine learning plane entity that comprises or is associated with the network entity.

9. The UE of claim 1, wherein:
  each machine learning model of the one or more machine learning models is associated with a respective scope corresponding to a location, a network slice, a deep neural network, a public land mobile network, a UE type, a radio resource control state, a communication service, a communication configuration, beam management, or any combination thereof; and
  the one or more processors are individually or collectively further operable to execute the code to cause the UE to transmit a request message based at least in part on a trigger event that comprises the UE having a condition that is within the respective scope of the machine learning model.

10. The UE of claim 1, wherein the one or more processors are individually or collectively further operable to execute the code to cause the UE to:
  determine an identifier associated with a second machine learning model of the one or more machine learning models or a second neural network function of the one or more neural network functions, the second machine learning model or the second neural network function associated with a second machine learning configuration; and
  initiate an upload of the second machine learning configuration to the machine learning model repository based at least in part on the identifier.

11. The UE of claim 1, wherein the activation function is associated with an activation message received from the network entity.

12. A network entity, comprising:
  one or more memories storing processor-executable code; and
  one or more processors coupled with the one or more memories and individually or collectively operable to execute the code to cause the network entity to:
    receive, from a user equipment (UE), capability information that corresponds to one or more neural network functions, one or more machine learning models, or any combination thereof;
    transmit, to the UE, a machine learning configuration corresponding to a neural network function of the one or more neural network functions or a machine learning model of the one or more machine learning models, wherein:
      the machine learning configuration corresponding to the one or more neural network functions is based at least in part on the capability information, and the one or more machine learning models, the one or more neural network functions, or any combination thereof are associated with a machine learning model repository that is included in or coupled with the network entity; and
    transmit, to the UE, an activation message for the neural network function or the machine learning model.

13. The network entity of claim 12, wherein the one or more processors are individually or collectively further operable to execute the code to cause the network entity to:
  receive, from the UE, a request message that comprises an indication of the machine learning model, the neural network function, or both, wherein the one or more processors are individually or collectively operable to execute the code to cause the network entity to transmit the machine learning configuration based at least in part on the request message.

14. The network entity of claim 13, wherein:
  to receive the request message, the one or more processors are individually or collectively operable to execute the code to cause the network entity to receive the request message via a central unit-control plane entity that comprises or is associated with the network entity; and
  to transmit the machine learning configuration, the one or more processors are individually or collectively operable to execute the code to cause the network entity to transmit the machine learning configuration via the central unit-control plane entity.

15. The network entity of claim 14, wherein the one or more processors are individually or collectively further operable to execute the code to cause the network entity to:
  transmit, to the UE, signaling indicating a first set of neural network functions or machine learning models included in a blacklist, a second set of neural network functions or machine learning models included in a whitelist, or both, wherein the neural network function or the machine learning model is included in the whitelist, excluded from the blacklist, or both.

16. The network entity of claim 12, wherein:
  to transmit the machine learning configuration, the one or more processors are individually or collectively operable to execute the code to cause the network entity to transmit the machine learning configuration via a machine learning control protocol layer.

17. The network entity of claim 12, wherein the neural network function or the machine learning model is associated with an identifier, and wherein the one or more processors are individually or collectively operable to execute the code to cause the network entity to transmit the machine learning configuration based least in part on the identifier.

18. The network entity of claim 17, wherein the one or more processors are individually or collectively operable to execute the code to cause the network entity to:
  transmit the machine learning configuration based at least in part on a download of the neural network function or the machine learning model from the machine learning model repository, the download based at least in part on the identifier.

19. The network entity of claim 17, wherein the one or more processors are individually or collectively further operable to execute the code to cause the network entity to:
  transmit, to the UE, an indication of the identifier associated with the machine learning configuration via a central unit-machine learning plane entity included in the network entity.

20. The network entity of claim 12, wherein:
  each machine learning model of the one or more machine learning models is associated with a respective scope corresponding to a location, a network slice, a deep neural network, a public land mobile network, a UE type, a radio resource control state, a communication service, a communication configuration, beam management, or any combination thereof; and the one or more processors are individually or collectively further operable to execute the code to cause the network entity to transmit the machine learning configuration based at least in part on the UE having a condition that is within the respective scope of the machine learning model.

21. A method for wireless communication at a user equipment (UE), comprising:

transmitting capability information that corresponds to one or more neural network functions, one or more machine learning models, or any combination thereof;

receiving a machine learning configuration corresponding to a neural network function of the one or more neural network functions or a machine learning model of the one or more machine learning models, wherein:

the machine learning configuration corresponding to the one or more neural network functions is based at least in part on the capability information, and the one or more machine learning models, the one or more neural network functions, or any combination thereof are associated with a machine learning model repository that is included in or coupled with a network entity, wherein, the neural network function or the machine learning model is to be activated based on an associated activation function.

22. The method of claim 21, further comprising:

receiving, from the network entity, an activation message wherein the activation function is associated with an activation message received from the network entity.

* * * * *